United States Patent [19]
Taniguchi et al.

[11] Patent Number: 5,159,375
[45] Date of Patent: Oct. 27, 1992

[54] CAMERA HAVING A REMOTE CONTROL FUNCTION

[75] Inventors: Nobuyuki Taniguchi, Nishinomiya; Hiroyuki Okada; Hidekazu Nakajima, both of Sakai; Kenji Tsuji, Kashiwara; Ikushi Nakamura, Sakai; Sadafusa Tsuji, Osakasayama, all of Japan

[73] Assignee: Minolta Camera Kabushiki Kaisha, Osaka, Japan

[21] Appl. No.: 625,082

[22] Filed: Dec. 7, 1990

[30] Foreign Application Priority Data

Dec. 8, 1989 [JP] Japan .................. 1-319849
Dec. 8, 1989 [JP] Japan .................. 1-319850

[51] Int. Cl.⁵ .................................. G03B 13/00
[52] U.S. Cl. .............................. 354/400; 354/266
[58] Field of Search ........................ 354/400–409, 354/266, 267.1, 131

[56] References Cited

U.S. PATENT DOCUMENTS

| | | | |
|---|---|---|---|
| 3,883,883 | 5/1975 | Sano et al. | 354/75 |
| 4,719,485 | 1/1988 | Shikaumi | 354/400 |
| 4,801,959 | 1/1989 | Chern | 354/266 |
| 4,962,400 | 10/1990 | Otani et al. | 354/403 |

FOREIGN PATENT DOCUMENTS 1-169873 11/1989 Japan .

OTHER PUBLICATIONS

An article on a camera "Zoom Super", Shashin Kogyo, Sep. 1989, p. 30, lines 5–13.
An article on camera "Olympus ISM", Shashin Kogyo, Jun. 1988, p. 76, right col., line 10 to left col., line 2.

Primary Examiner—Michael L. Gellner
Assistant Examiner—David M. Gray
Attorney, Agent, or Firm—Willian Brinks Olds Hofer Gilson & Lione

[57] ABSTRACT

A camera system includes a remote controller and a body of a camera. The remote controller is incorporated in a lens cap of the camera. A photographing magnification for an object is set by the remote controller. A taking lens of the camera is automatically driven to attain an in-focus position defined by a distance to the object and the magnification set by the remote controller. Thus, an image of a desired magnification can be photographed by remote control using the remote controller.

16 Claims, 33 Drawing Sheets

FIG.2B
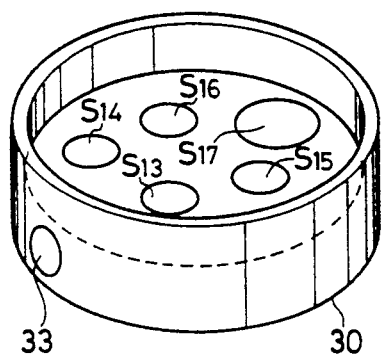
FIG.2C
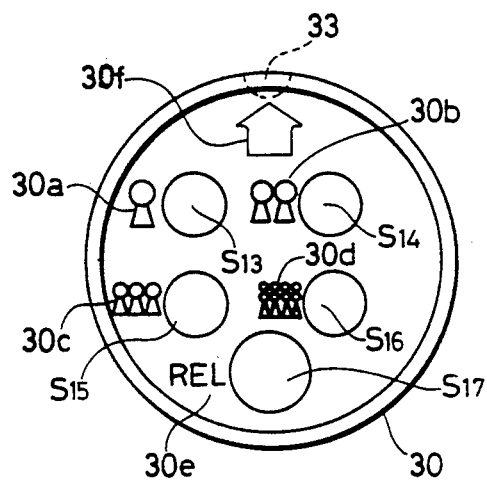
FIG.10A
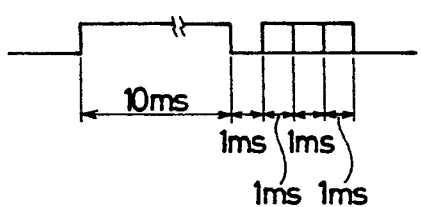
FIG.10B
| MODE DATA 1 2 3 | CONTENT OF MODE |
|---|---|
| 0 0 0 | RELEASE |
| 0 0 1 | AUTO ZOOM(1 PERSON)+RELEASE |
| 0 1 0 | AUTO ZOOM(2 PERSONS)+RELEASE |
| 0 1 1 | AUTO ZOOM(3 PERSONS)+RELEASE |
| 1 0 0 | AUTO ZOOM(MANY PERSONS)+RELEASE |

FIG.4

| ZOOM POSITION | TYPICAL f VALUE | ENCODER PATTERN S10 S9 S8 S7 S6 GND | FUNCTION S10 S9 S8 S7 S6 | HEXADECIMAL CODE |
|---|---|---|---|---|
| 1 | 90mm(TELE END) | | H L H H H | 1 7 H |
| 2 | 88mm | | H L H H L | 1 6 H |
| 3 | 85mm | | H L H L L | 1 4 H |
| 4 | 82mm | | H L H L H | 1 5 H |
| 5 | 79mm | | H L L L H | 1 1 H |
| 6 | 76mm | | H L L L L | 1 0 H |
| 7 | 73mm | | H L L H L | 1 2 H |
| 8 | 70mm | | H L L H H | 1 3 H |
| 9 | 67mm | | L L L H H | 0 3 H |
| 10 | 64mm | | L L L H L | 0 2 H |
| 11 | 61mm | | L L L L L | 0 0 H |
| 12 | 58mm | | L L L L H | 0 1 H |
| 13 | 55mm | | L L H L H | 0 5 H |
| 14 | 52mm | | L L H L L | 0 4 H |
| 15 | 49mm | | L L H H L | 0 6 H |
| 16 | 46mm | | L L H H H | 0 7 H |
| 17 | 43mm | | L H H H H | 0 F H |
| 18 | 41mm | | L H H H L | 0 E H |
| 19 | 38mm(WIDE END) | | L H H L L | 0 C H |
| 20 | DURING RETRACTING | | L H H L H | 0 D H |
| 21 | RETRACTED | | L H L L H | 0 9 H |

BLACK: ON

L: ON
H: OFF

FIG.19

| DISTANCE TO OBJECT (m) | DISTANCE DATA (ZONE No) |
|---|---|
| ~ 8.5 | 1 |
| 8.5 ~ 5.6 | 2 |
| 5.6 ~ 4.2 | 3 |
| 4.2 ~ 3.3 | 4 |
| 3.3 ~ 2.8 | 5 |
| 2.8 ~ 2.4 | 6 |
| 2.4 ~ 2.1 | 7 |
| 2.1 ~ 1.9 | 8 |
| 1.9 ~ 1.7 | 9 |
| 1.7 ~ 1.54 | 10 |
| 1.54 ~ 1.42 | 11 |
| 1.42 ~ 1.32 | 12 |
| 1.32 ~ 1.23 | 13 |
| 1.23 ~ 1.15 | 14 |
| 1.15 ~ 1.08 | 15 |
| 1.08 ~ 1.03 | 16 |
| 1.03 ~ 0.972 | 17 |
| 0.972 ~ 0.925 | 18 |
| 0.925 ~ 0.884 | 19 |
| 0.884 ~ 0.846 | 20 |
| 0.846 ~ 0.812 | 21 |
| 0.812 ~ 0.781 | 22 |
| 0.781 ~ 0.753 | 23 |
| 0.753 ~ 0.734 | 24 |
| 0.734 ~ 0.700 | 25 |

FIG. 21

TABLE (1)

| DISTANCE DATA (ZONE No) | PARAMETER D |
|---|---|
| 1 | 11715 |
| 2 | 6622 |
| 3 | 4726 |
| 4 | 3683 |
| 5 | 3023 |
| 6 | 2567 |
| 7 | 2233 |
| 8 | 1978 |
| 9 | 1776 |
| 10 | 1614 |
| 11 | 1479 |
| 12 | 1367 |
| 13 | 1271 |
| 14 | 1189 |
| 15 | 1118 |
| 16 | 1055 |
| 17 | 999 |
| 18 | 950 |
| 19 | 906 |
| 20 | 866 |
| 21 | 830 |
| 22 | 797 |
| 23 | 767 |
| 24 | 740 |
| 25 | 715 |

$f = \beta \cdot D$ ($\beta$ = MAGNIFICATION)

TABLE (2)

| RESULT OF CALCULATION f | STOP POSITION |
|---|---|
| ~38 | 19 |
| ~41 | 18 |
| ~43 | 17 |
| ~46 | 16 |
| ~49 | 15 |
| ~52 | 14 |
| ~55 | 13 |
| ~58 | 12 |
| ~61 | 11 |
| ~64 | 10 |
| ~67 | 9 |
| ~70 | 8 |
| ~73 | 7 |
| ~76 | 6 |
| ~79 | 5 |
| ~82 | 4 |
| ~85 | 3 |
| ~88 | 2 |
| 89~ | 1 |

FIG.22
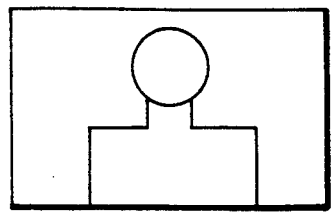
(a) ONE PERSON   $\beta = 1/30$
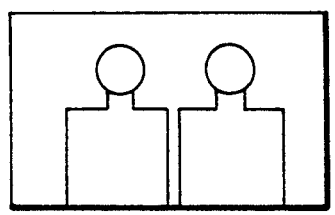
(b) TWO PERSONS   $\beta = 1/50$
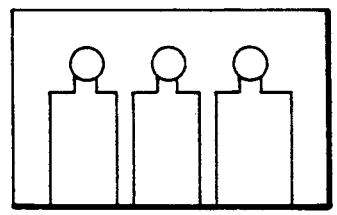
(c) THREE PERSONS   $\beta = 1/70$
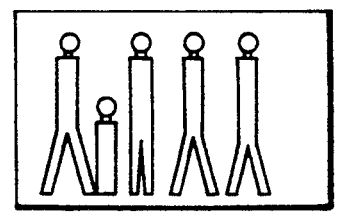
(d) MANY PERSONS   $\beta = 1/120$

FIG. 24

TABLE (3)

| ZOOM POSITION | OPEN F No (AVo) |
|---|---|
| 1 | 5.875 |
| 2 | 5.875 |
| 3 | 5.875 |
| 4 | 5.750 |
| 5 | 5.625 |
| 6 | 5.500 |
| 7 | 5.375 |
| 8 | 5.250 |
| 9 | 5.125 |
| 10 | 5.000 |
| 11 | 4.875 |
| 12 | 4.750 |
| 13 | 4.500 |
| 14 | 4.375 |
| 15 | 4.125 |
| 16 | 3.875 |
| 17 | 3.750 |
| 18 | 3.625 |
| 19 | 3.625 |

| ISO SENSITIVITY (Sv) | ISO CODE | | |
|---|---|---|---|
| | Dx3 | Dx2 | Dx1 |
| 25 (3) | 1 | 1 | 1 |
| 50 (4) | 1 | 1 | 0 |
| 100 (5) | 1 | 0 | 1 |
| 200 (6) | 1 | 0 | 0 |
| 400 (7) | 0 | 1 | 1 |
| 800 (8) | 0 | 1 | 0 |
| 1600 (9) | 0 | 0 | 1 |
| 3200 (10) | 0 | 0 | 0 |

FIG. 30

TABLE (4)

| ADDRESS | ZOOM POSITION DATA | ADDRESS | ZOOM POSITION DATA |
|---|---|---|---|
| 0 0 | $(11)_{10}$ | 1 0 | $(6)_{10}$ |
| 0 1 | $(12)_{10}$ | 1 1 | $(5)_{10}$ |
| 0 2 | $(10)_{10}$ | 1 2 | $(7)_{10}$ |
| 0 3 | $(9)_{10}$ | 1 3 | $(8)_{10}$ |
| 0 4 | $(14)_{10}$ | 1 3 | $(3)_{10}$ |
| 0 5 | $(13)_{10}$ | 1 5 | $(4)_{10}$ |
| 0 6 | $(15)_{10}$ | 1 6 | $(2)_{10}$ |
| 0 7 | $(16)_{10}$ | 1 7 | $(1)_{10}$ |
| 0 8 | $(0)_{10}$ | 1 7 | $(0)_{10}$ |
| 0 9 | $(21)_{10}$ | 1 9 | $(0)_{10}$ |
| 0 A | $(0)_{10}$ | 1 A | $(0)_{10}$ |
| 0 B | $(0)_{10}$ | 1 B | $(0)_{10}$ |
| 0 C | $(19)_{10}$ | 1 C | $(0)_{10}$ |
| 0 D | $(20)_{10}$ | 1 D | $(0)_{10}$ |
| 0 E | $(18)_{10}$ | 1 E | $(0)_{10}$ |
| 0 F | $(17)_{10}$ | 1 F | $(0)_{10}$ |

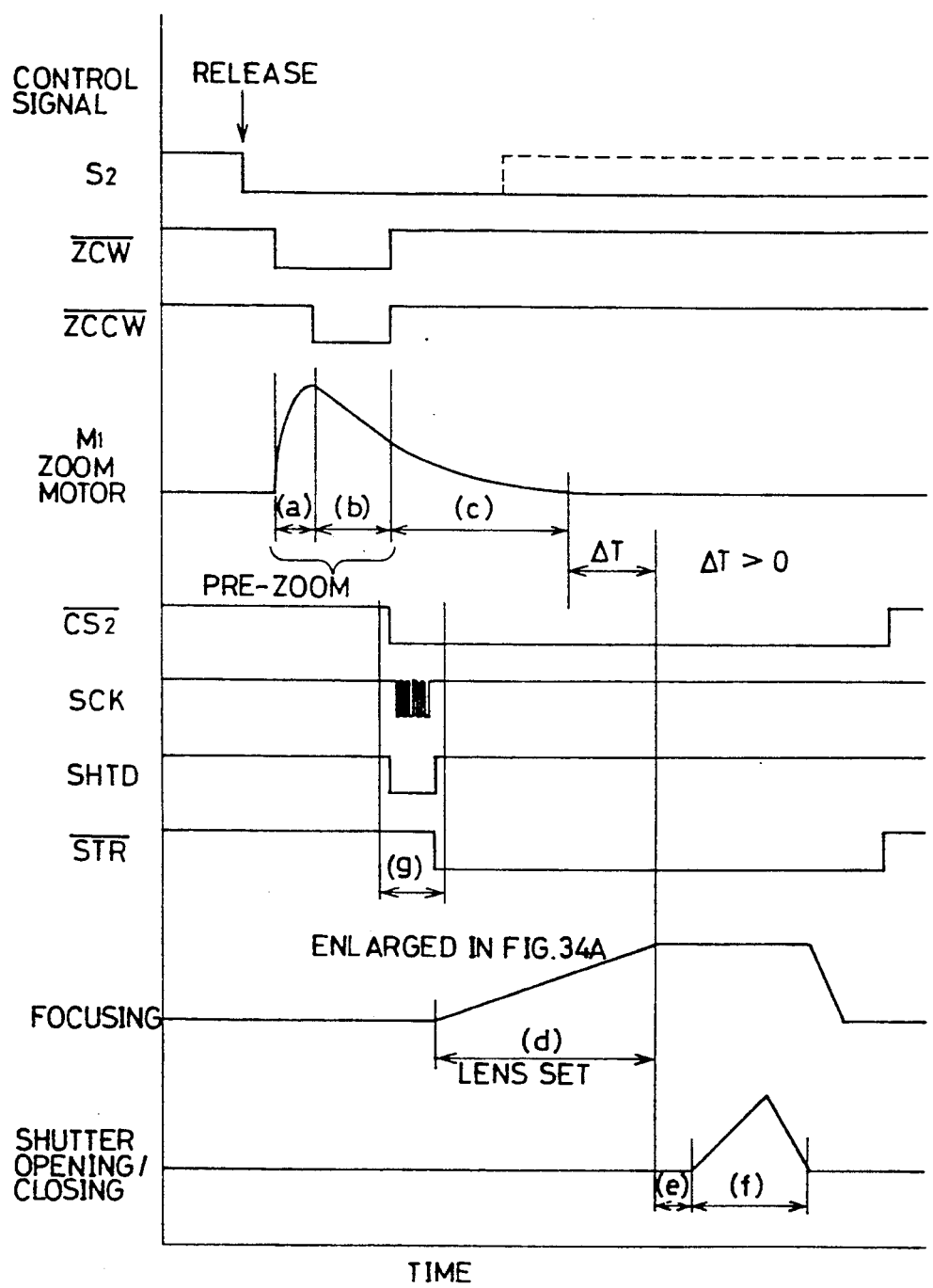

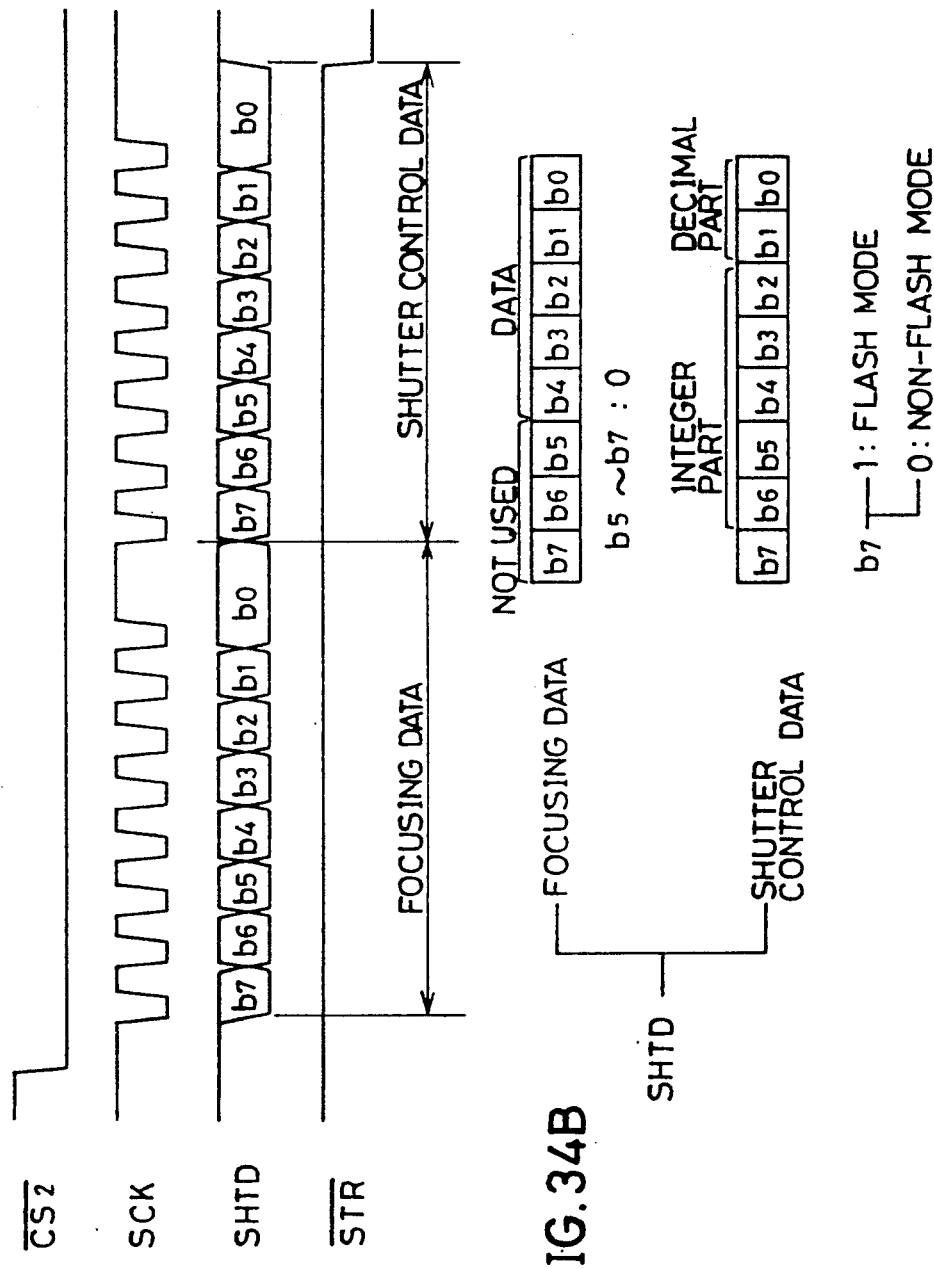

| EVC | To (ms) | EVC | To (ms) |
|---|---|---|---|
| 6 | 128.5 | 12 | 13.45 |
| 7 | 72.5 | 13 | 11.9 |
| 8 | 42.4 | 14 | 9.80 |
| 9 | 26.7 | 15 | 7.52 |
| 10 | 20 | 16 | 5.48 |
| 11 | 15.8 | 17 | 4.11 |

CAMERA HAVING A REMOTE CONTROL FUNCTION

BACKGROUND OF THE INVENTION

1. Field of the Invention

The present invention relates to to cameras which enables photographing by remote control operation.

2. Description of the Related Art

Cameras having a remote control function have been proposed. Such cameras capable of taking pictures by a remote controller are very convenient because the photographer can determine release timing in the case of taking a picture of himself.

There have been also known cameras having a remote control function such as a Canon's camera "Auto Boy Super", in which a remote controller is detachably provided in the camera body.

However, in conventional remote-controlled photographing for taking pictures without looking in a finder, it is difficult for the photographer to suppose a state in which an object appears in a photographing area. Accordingly, in the conventional cameras, it is not possible for the photographer to take a desired picture without having a sufficient knowledge of relations of combinations of distances and focal lengths to a size (i.e., a photographing magnification) of an object actually appearing in the photographing area of the camera.

SUMMARY OF THE INVENTION

An object of the present invention is to provide a camera having a remote control function by which a user can easily know a state of an object appearing in a photographing area of the camera at the time of taking a picture using a remote controller without looking in a finder.

Another object of the present invention is to provide a camera having a remote control function by which a user can designate a size of an object appearing in a photographing area of the camera from a remote controller at the time of taking a picture using the remote controller.

Still another object of the present invention is to provide a camera having a remote control function by which a user can make an object appear constantly with a fixed size in a photographing area even if the object moves forward or backward at the time of taking a picture thereof using a remote controller.

A further object of the present invention is to provide a camera having a remote control function by which an object can be made to appear with a suitable size in a photographing area according to the number of persons of the object at the time of taking a picture using a remote controller.

A further object of the present invention is to provide a camera provided with a remote controller which is detachably attached to a camera body and which causes little change in an entire size of the camera when the remote controller is attached to the camera.

In order to attain the above-described objects, a camera system according to the present invention includes: a remote controller including a magnification setting device; and a camera including a taking lens capable of changing a focal length, a distance measuring device for detecting a distance to an object, a determining device for determining the focal length of the taking lens based on the magnification set by the magnification setting device and information on the distance to the object detected by the distance measuring device, and a drive device for driving the taking lens to attain the focal length determined by the determining device.

Since the camera system according to the present invention includes the above-described elements, the photographing magnification can be set by remote control and the taking lens is driven so that an image can be in focus with the set magnification. Thus, it is possible to provide a camera having a remote control function by which the user can designate a size of an object in a photographing area of the camera by using the remote controller.

Preferably, the remote controller includes an operating member for designating the number of persons of the object.

Since the remote controller includes the above-mentioned member, it is possible to provide a camera having the remote control function by which the object can be made to appear with a suitable size in a photographing area according to the number of persons of the object.

According to another aspect of the present invention, a camera system includes: a lens cap detachably provided on a front surface of a taking lens to cover the front surface of the taking lens, including an operating member, and a signal generator for generating a prescribed signal to a camera body in a wireless manner in response to operation of the operating member; and a camera including the taking lens covered with the lens cap, a receiver for receiving the prescribed signal of the signal generator in a wireless manner, and a device for determining operation of the camera in response to the prescribed signal received by the receiver.

In the camera system according to the present invention, a remote controller is provided in the lens cap. Consequently, it is possible to provide a camera having the remote controller which is detachably attached to a camera body and which causes little change in an entire size of the camera when the remote controller is attached to the camera.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2B and 2C are views showing a remote controller according to the present invention.

FIG. 4 is a diagram for explaining a zoom encoder.

FIG. 10A is a diagram showing a remote control signal, and FIG. 10B is a diagram showing data and contents of the remote control signal.

FIG. 12 is a flow chart showing a routine with a light measurement switch S1 on.

FIG. 13 is a flow chart showing a routine with an auto zoom mode switch S3 on.

FIG. 14 is a flow chart showing a routine with a photographing mode switch on.

FIG. 15 is a flow chart showing a routine with a zoom switch on.

FIG. 19 is a diagram showing a relation between a distance to an object and measured distance data.

FIG. 21 is a diagram showing details of AZ calculation.

FIG. 22 shows examples of auto zoom in remote-controlled photographing.

FIG. 24 is a table (3) showing a relation between a zoom position and an open F value.

FIG. 30 shows a reference table (4) for zoom position reading.

FIG. 33 is a timing chart in release operation.

FIGS. 34A and 34B are diagrams showing timing of data transmission to a shutter block in release operation.

DESCRIPTION OF THE PREFERRED EMBODIMENTS

Figure 1:
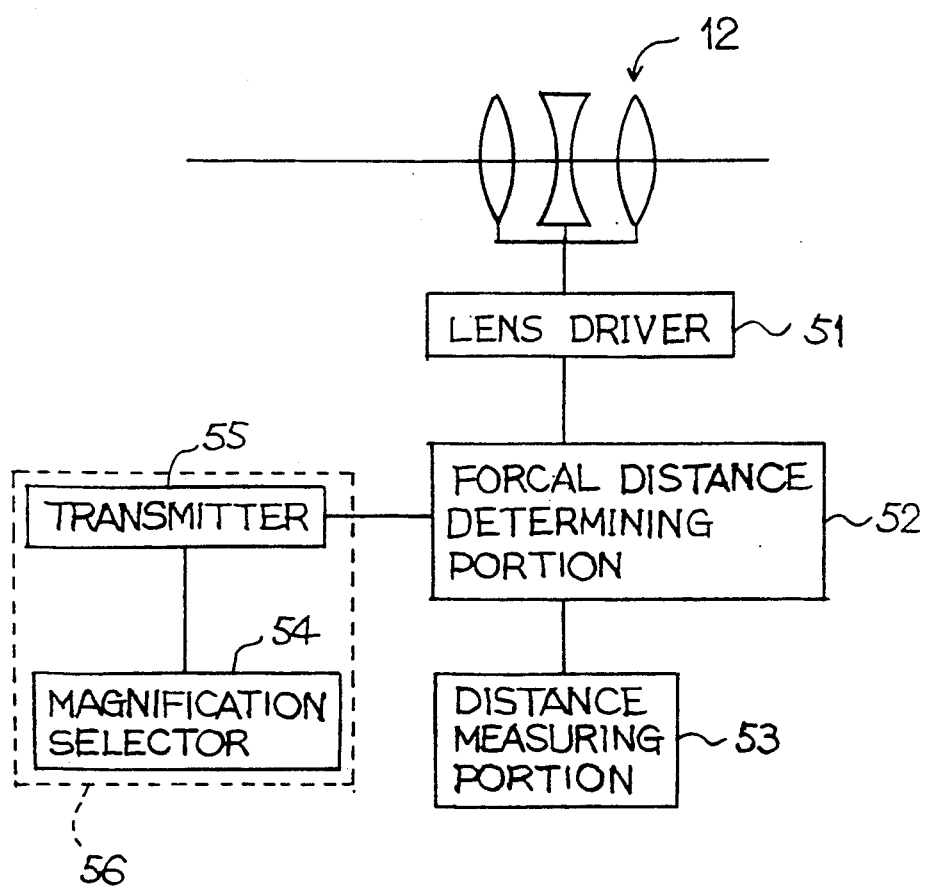
FIG. 1 is a block diagram showing an embodiment of the present invention.

Referring to FIG. 1, a camera having a remote control function and an auto zoom function according to an embodiment of the present invention includes: a taking lens 12, lens driver 51 to drive lens 12, focal length determining portion 52, distance measuring portion 53 and remote controller 56. The remote controller 56 includes transmitter 55 and photographing magnification selecting portion 54. The focal length of the taking lens 12 is determined automatically by focal length detecting portion 52 based on a prescribed signal showing magnification from remote controller 56 and object distance information from distance measuring portion 53. The taking lens 12 is moved to the position corresponding to the determined focal length by lens driver 51. Therefore, photographing magnification is remotely selected and based on the magnification information of object distance, the magnification of auto zoom is automatically determined.

Figure 2A:
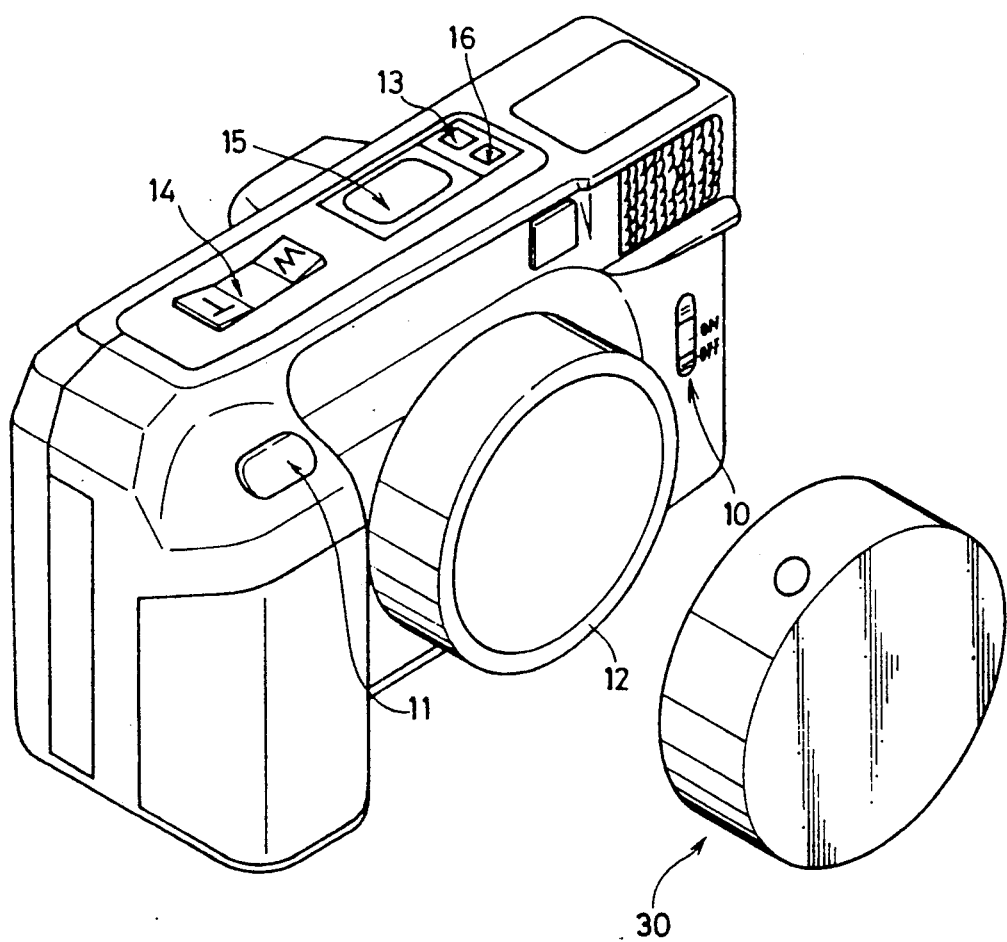
FIG. 2A is an appearance view of a camera body to which the present invention is applied.

With reference to FIG. 2A, more specific embodiment is described in the following. The camera of the present invention includes a main switch operation lever 10 on the front surface of the camera body for enabling operation of the camera; a release button 11 provided in an upper portion of the camera body for enabling light measurement and exposure; a taking lens 12 provided on the front surface of the camera body for photographing an object; an auto zoom mode button 13 provided in an upper portion of the camera body for setting an auto zoom mode; a zoom operation lever 14 which is a seesaw switch, provided in the upper portion of the camera body for switching the focal length of the taking lens 12 between a tele direction (i.e., the direction in which the focal length increases) and a wide direction (i.e., the direction in which the focal length decreases); a liquid crystal display LCD 15 provided in the upper portion of the camera body for displaying an aperture value, a shutter speed and so on; a photographing mode button 16 for photographing the object in a self mode or a remote control mode; a light receiving window 32 for receiving a remote control signal; and a lens cap 30 covering the taking lens 12.

The release button 11 is of a two-stroke type. At the first stroke (in a half depression), a light measurement switch S1 is turned on to start measurement of light and, at the second stroke (in full depression), a release switch S2 is turned on to start exposure. The zoom operation lever 14 includes a zoom-in switch S4 for moving the taking lens in the tele direction, and a zoom-out switch S5 for moving the taking lens 12 in the wide direction. The focal length of the taking lens 12 is in the range of 38 to 90 mm.

The lens cap 30 can be attached to the camera body to protect the lens of the camera. The lens cap 30 contains a transmitting circuit for performing remote-controlled photographing operation. Operation switches S13 to S16 for remote-controlled photographing are provided on the back surface (on the lens side) of the lens cap 30 as shown in FIG. 2B. By operation of those switches, projecting means 33 provided in the lens cap 30 emits light to transmit a signal to the camera.

A one-person photographing mark 30a, a two-persons photographing mark 30b, a three-persons photographing mark 30c, a many-persons photographing mark 30d, a release button mark 30e, and an arrow mark 30f indicating a projecting direction of the projecting means 33 are put in positions adjacent to the operation switches S13 to S17 of the lens cap 30, respectively, as shown in FIG. 2C. In place of those photographing marks 30a to 30d, values indicating photographing magnifications $\beta$ suited for respective purposes of use may be directly inscribed on those positions.

A conventional remote control transmitter structured detachably in a camera body involves a disadvantage that when it is attached to the camera body, the entire size of the camera is increased. According to the embodiment of the invention, the remote control transmitter is provided in the lens cap as described above. Thus it is possible to provide a camera having a remote control transmitter of a detachable type which causes little change in the entire size of the camera when it is attached to the camera body.

Figure 3:
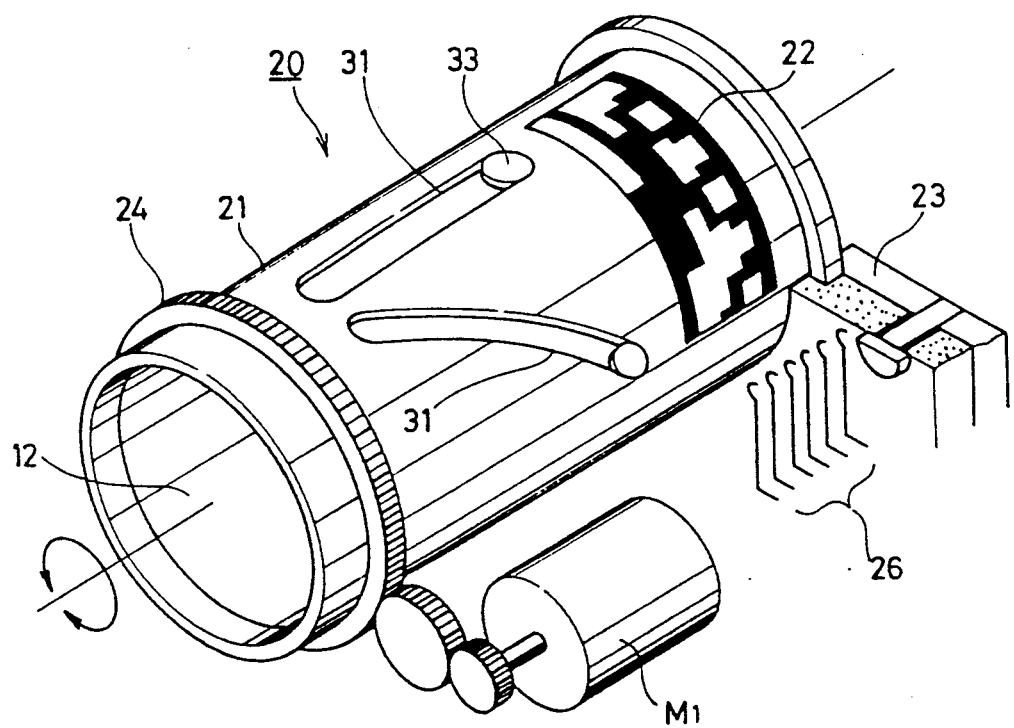
FIG. 3 is a perspective view showing a lens barrel unit of a taking lens of a camera to which the present invention is applied.

FIG. 3 is a perspective view of a lens barrel unit 20 for holding the taking lens 12. Referring to FIG. 3, the lens barrel unit 20 comprises: a lens barrel (cam ring) 21 having one end holding the taking lens; a zoom motor M1 provided near the lens-side end of the lens barrel 21 for moving the taking lens 12 in the tele direction or the wide direction by rotating the lens barrel 21; a zoom encoder 22 for detecting a zoom position (i.e., the focal length) defined by the rotation of the lens barrel 21; an encoder brush 26 for obtaining output signals S6 to S10 from the zoom encoder 22; and a holding member 23 for holding the lens barrel 21 on the camera body. A lens barrel rotation gear 24 for transmitting the drive force of the zoom motor M1 to the lens barrel 21 is provided around the lens barrel 21. The zoom motor M1 is driven by operation of the zoom operation lever 14 shown in FIG. 2A and the drive force is transmitted to the lens barrel 21 through the lens barrel rotation gear 24, whereby the focal length of the taking lens 12 is changed. The focal length at the lens stop position is detected by the zoom encoder 22 and the focal length is transmitted as an encoder signal through the encoder brush 26 to a control central processing unit (CPU) 1 provided in the camera body. This will be described later in detail.

FIG. 4 is a diagram showing relations between the output signals of the zoom encoder 22 and the focal lengths of the taking lens 12 described in connection with FIG. 3. Referring to FIG. 4, the zoom encoder 22 is a gray code type encoder and it has an encoder pattern as shown in the center of the figure. The zoom encoder has 21 zoom positions represented as 1 to 21 and a typical focal length for each zoom position is represented as a typical f value. For example, the typical f value with the zoom position 1 is 90 mm and the taking lens 12 in this case is at the tele end. On the other hand, the typical f value with the zoom position 19 is 38 mm and the taking lens 12 in this case is at the wide end. The zoom positions 20 and 21 are the positions in which the taking lens 12 is in a retracted state. The encoder pattern is as shown in the center of the figure and the output signals S6 to S10 as shown are supplied as encoder signals from the encoder brush 26. The contents of the signals are shown in the column of "function" in which on and off states of the encoder pattern are represented as H and L, respectively. The contents of the functions are represented as hexadecimal codes. More specifically, if the zoom position is defined, the typical f value is defined accordingly and the output data in that case is provided as a hexadecimal code in five bits.

Figure 5:
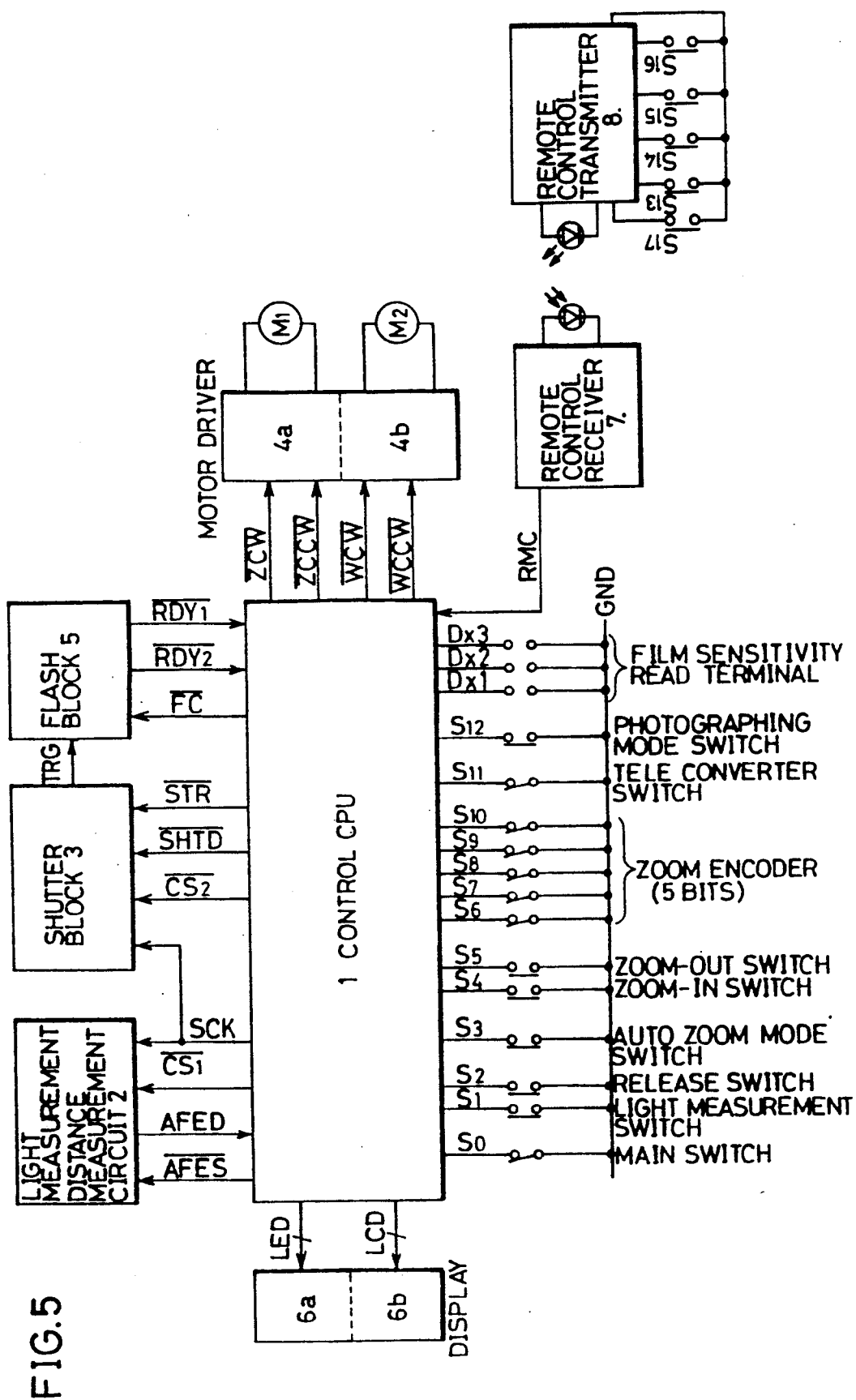
FIG. 5 is an electric circuit diagram of a camera capable of performing auto zoom and remote-controlled photographing according to the present invention.

FIG. 5 is a schematic block diagram showing an electric circuit of the camera having the remote control function and the auto zoom function according to the present invention. Referring to FIG. 5, the electric circuit of the camera having the remote control function and the auto zoom function according to the present invention comprises the control CPU 1 which receives the output signals S6 to S10 represented in five bits from the switches in the camera body such as the main switch S0 or from the zoom encoder shown in FIG. 3, and the output signals from film sensitivity reading terminals DX1, DX3 described afterwards and controls the entire system of the camera in response to those output signals. The control CPU 1 is connected with: a light measurement·distance measurement circuit 2 responsive to a clock signal SCK for serial communication; a flash block 5 which provides monitor signals $\overline{RDY1}$, $\overline{RDY2}$ in response to a flash boosting start signal $\overline{FC}$ from the control CPU 1; a motor driver 4 which controls the operation of the zoom motor M1 and the winding/rewinding motor M2 in response to the output signals; and a display unit 6 which displays prescribed data on the liquid crystal display LCD 15 in response to output signals LED, LCD from the CPU 1. The control CPU 1 is further connected with: a remote control receiver 7 which receives a remote control signal and supplies a reception signal to the control CPU 1; and a remote control transmitter 8 which receives input signals from remote control operation switches S13 to S16 and generates different remote control signals (to be described in detail afterwards) in response to the input signals. The light measurement·distance measurement circuit 2 receives a data destination designating signal $\overline{CS1}$ from the control CPU 1 and a light measurement·distance measurement circuit turn-on signal $\overline{AFES}$ for turning on the light measurement·distance measurement circuit, and supplies a light measurement·distance measurement circuit data read signal AFED to the control CPU 1. A shutter block 3 receives a data destination designating signal $\overline{CS2}$, focus data, a shutter control data output signal $\overline{SHTD}$ and a focusing start instruction signal $\overline{STR}$ from the control CPU 1. The motor driver 4 comprises a zoom motor driver 4a for controlling the zoom motor M1, and a winding/rewinding motor driver 4b for controlling the winding/rewinding motor M2. The zoom motor driver 4a receives zoom motor M1 drive signals $\overline{ZCW}$, $\overline{ZCCW}$ from the control CPU 1, while the winding/rewinding motor driver 4b receives film winding motor control signals $\overline{WCW}$, $\overline{WCCW}$ from the control CPU 1. The display unit 6 receives a light emitting diode display signal LED and a liquid crystal display signal LCD and displays the contents of those signals.

The remote control receiving circuit 7 receives an external remote control signal and supplies a reception signal RMC to the control CPU 1. The reception signal RMC is normally at low (L) level and it rises to high (H) level when the external signal is received.

Table 1 shows values of the control signals $\overline{ZCW}$, $\overline{ZCCW}$ of the zoom motor M1 and the states of the motor with those values. Table 2 shows values of the control signals $\overline{WCW}$, $\overline{WCCW}$ of the winding/rewinding motor M2 and the states of the motor with those signals.

TABLE 1

| 4a | $\overline{ZCW}$ | $\overline{ZCCW}$ | State of motor |
|---|---|---|---|
| Zoom motor M1 | H | L | OFF |
| | L | H | regulator rotation (zoom-in) |
| | H | L | reverse rotation (zoom-out) |
| | L | L | brake |

TABLE 2

| 4b | $\overline{WCW}$ | $\overline{WCCW}$ | State of motor |
|---|---|---|---|
| Wind/rewind motor M2 | H | H | OFF |
| | L | H | regular rotation (winding) |
| | H | L | reverse rotation (rewinding) |
| | L | L | brake |

Figure 6:
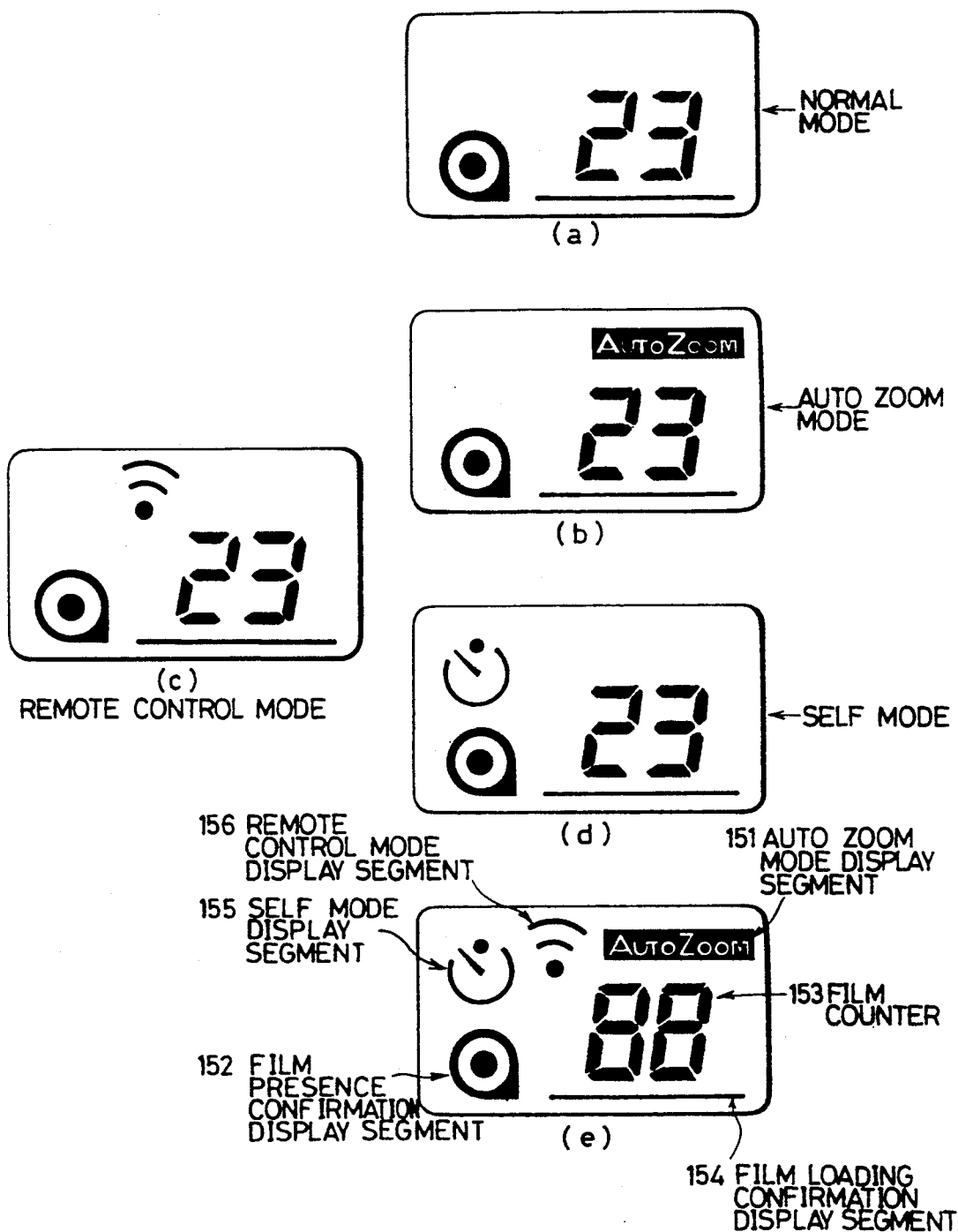
FIG. 6 shows display segments of a liquid crystal display LCD.

Referring to FIG. 6, the contents displayed on the liquid crystal display LCD will be described. When the camera is in the normal mode as described below, the content as shown in (a) of FIG. 6 is displayed. In the auto zoom mode, the content as shown in (b) of FIG. 6 is displayed. In the remote control mode, the content as shown in (c) of FIG. 6 is displayed. In a self mode as described below, the content as shown in (d) of FIG. 6 is displayed. Display segments necessary for displaying such contents are shown in (e) of FIG. 6. Referring to FIG. 6 (e), the liquid crystal display LCD includes an auto zoom mode display segment 151, a film presence confirmation display segment 152, a film counter 153, a film loading confirmation display segment 154, a self mode display segment 155, and a remote control mode display segment 156.

Figure 7:
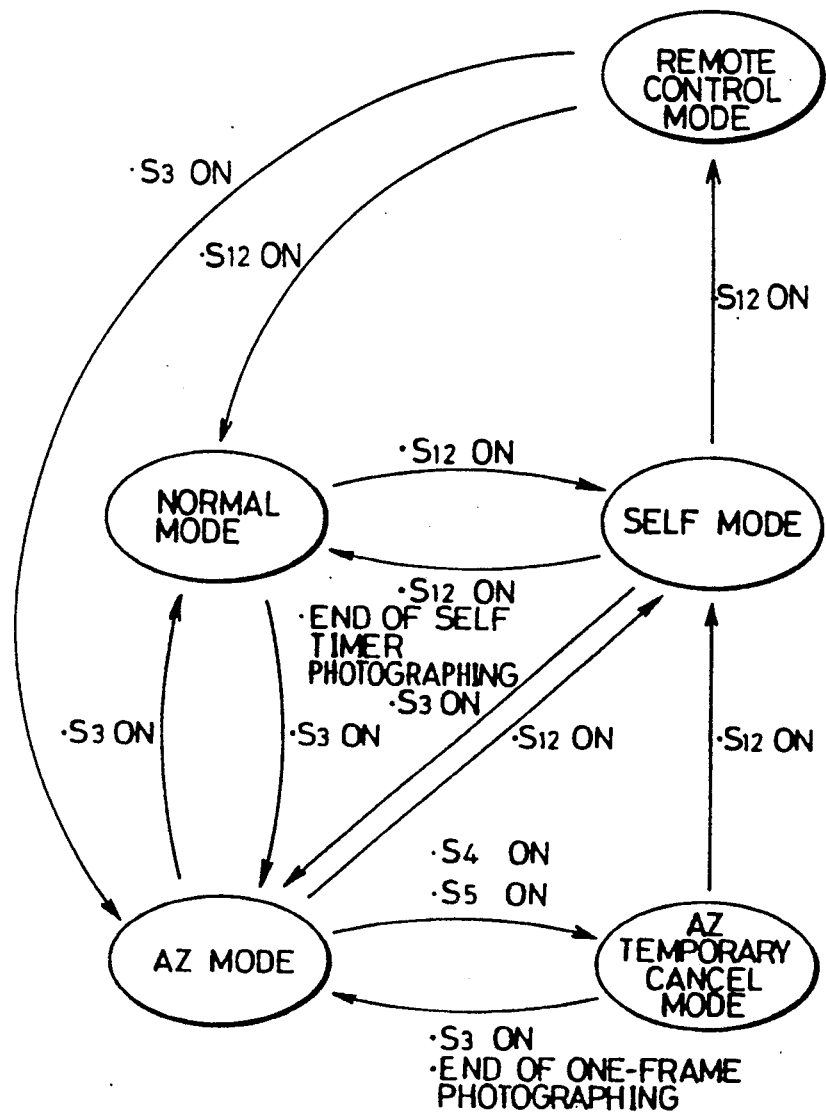
FIG. 7 is a diagram showing switching of photographing modes in a camera capable of performing auto zoom and remote-controlled photographing.

The camera having the remote control function and the auto zoom function according to the present invention has the normal mode, the auto zoom mode, the self mode, the remote control mode, and an auto zoom temporary cancel mode as described in connection with FIG. 6. The relation of switching among those modes is shown in FIG. 7. The normal mode is a mode in which neither selftimer-photographing nor remote-controlled photographing is effected and it is an initial mode when the camera starts to be operated. The self mode is a mode in which selftimer-photographing is effected. This mode is selected in the case of taking a picture of gathered people and so on. In this mode, exposure is carried out after an elapse of predetermined time from the depression of the release button 11. The auto zoom mode (AZ mode) is a mode in which the focal length f of the taking lens 12 is automatically regulated in order to take a photograph with a predetermined magnification defined in relation to the distance D to a given object. The AZ temporary cancel mode is a mode in which the AZ mode is temporarily canceled. The remote control mode is a mode in which photographing is effected by remote control.

Referring to FIG. 7, switching among the above-described five modes will be described. In order to switch from the normal mode at the start of operation of the camera to the AZ mode, it is necessary to depress the auto zoom mode button 13 shown in FIG. 2A. In order to return from the AZ mode to the normal mode, it is also necessary to depress the auto zoom mode button 13. In other words, each time the auto zoom mode button 13 is depressed, switching between the normal mode and the AZ mode occurs. In order to switch from the normal mode to the self mode, it is necessary to depress the photographing mode button 16 shown in FIG. 2A. In order to switch to the remote control mode, it is necessary to depress the photographing mode button 16 in the self mode. When the photographing mode button 16 is depressed in the remote control mode, the mode returns to the normal mode. Thus, each time the photographing mode button 16 is depressed, switching occurs in the order of normal mode →self mode→remote control mode→normal mode. After selftimer-photographing is terminated in the self mode, the mode automatically returns to the normal mode. In order to switch from the AZ mode to the AZ temporary cancel mode, it is only necessary to depress the zoom-in switch S4 or the zoom-out switch S5 by using the zoom operation lever 14 shown in FIG. 2A. Conversely, in order to return from the AZ temporary cancel mode to the AZ mode, it is necessary to turn on the auto zoom mode switch S3 by depressing the auto zoom mode button 13 shown in FIG. 2A or to terminate photographing for one frame. In order to switch from the AZ temporary cancel mode to the self mode, it is only necessary to turn on photographing mode switch S12 by depressing the photographing mode button 16. In order to switch between the AZ mode and the self mode, it is only necessary to turn on the auto zoom mode switch S3 or photographing mode switch S12. In order to switch from the remote control mode to the AZ mode, it is only necessary to turn on the auto zoom mode switch S3.

Figure 8:
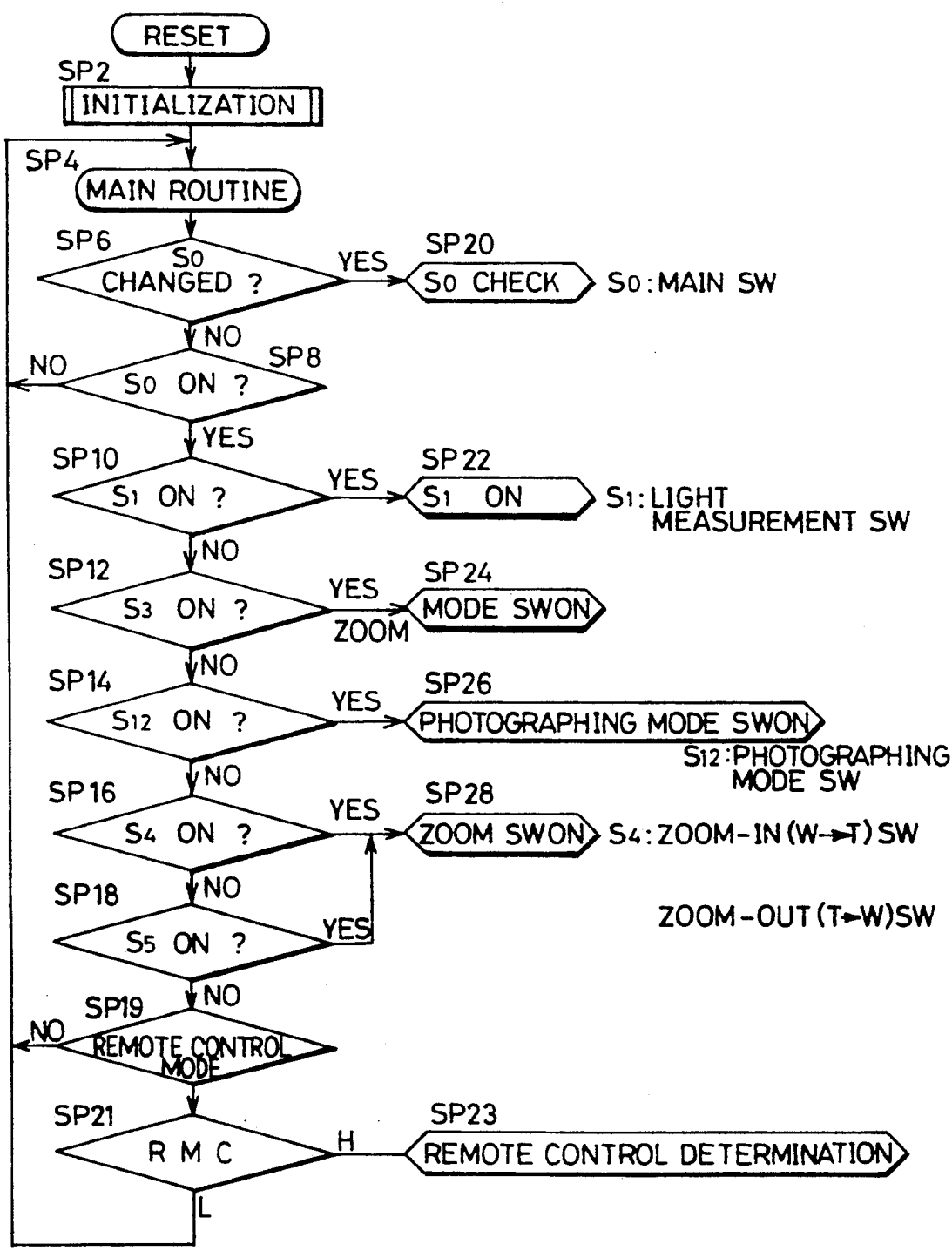
FIG. 8 is a flow chart showing a main routine of a camera capable of performing auto zoom and remote-controlled photographing according to the present invention.

FIG. 8 is a flow chart of a main routine showing the operation in the camera shown in FIG. 2A. The camera having the remote control function and the auto zoom function according to the present embodiment starts the operation when the camera body is in a reset state after turn-on of the battery. Referring to FIG. 8, when the camera is reset, the program enters an initialization subroutine (step SP2) for initializing various parameters, flags and memories to operate the camera. Then, the main routine (step SP4) starts and it is determined whether the state of the main switch S0 is changed or not (in step SP6). If it is determined that the state of the main switch S0 is changed, the program proceeds to a main switch check routine (in step SP20) for checking the state of the main switch S0. If it is determined in step SP6 that the state of the main switch S0 is not changed, it is determined whether the main switch S0 is on or not (in step SP8). If it is determined that the main switch S0 is off, the program proceeds to the main routine (in step SP4). If it is determined that the main switch S0 is on, it is determined whether the light measurement switch S1 is on or not (in step SP10). If it is determined that the switch S1 is on, the program proceeds to a light measurement switch on routine (in step SP22). If the light measurement switch S1 is not on, it is determined whether the auto zoom mode switch S3 is on or not (in step SP12). If it is determined that the switch S3 is on, the processing flow proceeds to a mode switch on routine (in step SP24). If it is determined that the auto zoom mode switch S3 is off, it is determined whether the photographing mode switch S12 is on or not (in step SP14). If it is determined that the switch S12 is on, the processing flow proceeds to a photographing mode switch on routine (in step SP26). If it is determined that the switch S12 is off, it is determined whether the zoom-in switch S4 is on or not. If the zoom-in switch S4 is not on, it is determined whether the zoom-out switch S5 is on or not. If the zoom-in switch S4 is on or the zoom-out switch S5 is on, the processing flow proceeds to a zoom switch on routine (in step SP28). If it is determined in step SP18 that the zoom-out switch S5 is off, it is determined in step SP19 whether the remote control mode is selected or not. If the remote control mode is not selected, the program returns to the main routine (in step SP4). If the remote control mode is selected, the state of the signal RMC is determined. If the state of the signal RMC is H by reception of the remote control signal, the program proceeds to a remote control determination routine in step SP23. If it is L, the processing flow proceeds to the main routine (in step SP4).

Figure 9:
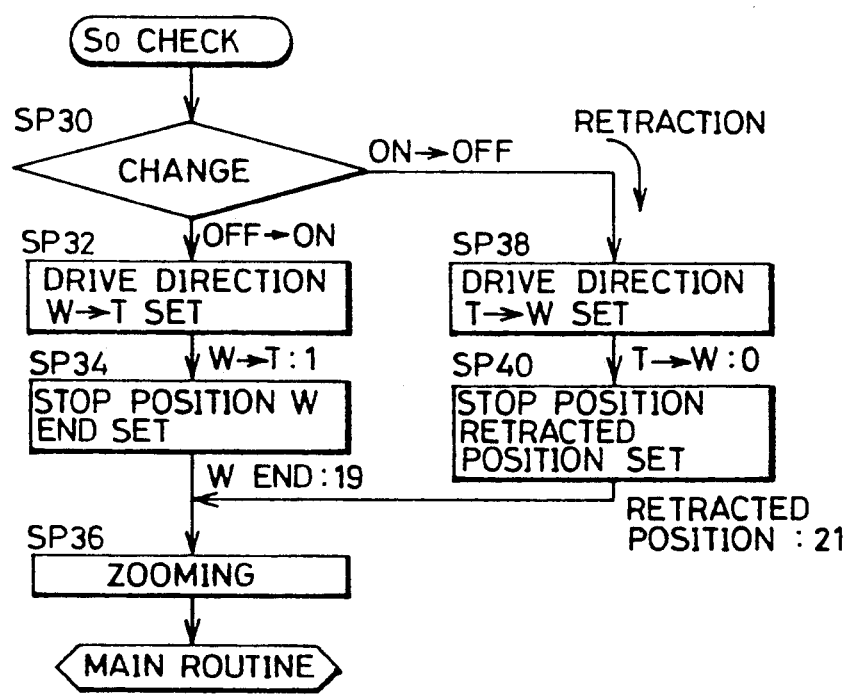
FIG. 9 is a flow chart of a main switch S0 check routine.

FIG. 9 is a flow chart showing the details of the main switch check routine in step SP20 of the main routine of FIG. 8. Referring to FIG. 9, when the main switch S0 check routine starts, it is first determined whether the change of the main switch S0 is from the off state to the on state or not (in step SP30). If the change is from the off state to the on state, the direction of drive of the taking lens 12 is set to the tele direction (in step SP32). Then, the stop position of the taking lens 12 is set at the wide end (the zoom position 19 shown in FIG. 4). Conversely, if it is determined in step SP30 that the change of the main switch S0 is from the on state to the off state, retracting operation of the taking lens 12 is required and, consequently, the drive direction is set to the wide direction (in step SP38) and the stop position of the taking lens 12 is set to the retracted position (the zoom position 21 shown in FIG. 4) in step SP40. After the stop position is set in step SP34 or SP40, the processing flow proceeds to a zooming subroutine (in step SP36) and then returns to the main routine (in step SP4).

The drive direction set in step SP32 or SP38 is stored as data "1" or "0" in a RAM of the control CPU 1. More specifically, "1" is set if the drive direction is the tele direction, and "0" is set if it is the wide direction.

Next, the retracting operation of the taking lens 12 will be described. The retracted state of the taking lens 12 is a state in which the lens barrel 21 is contained in the camera body when the taking lens 12 is not used. When the taking lens 12 is in the retracted position represented as the zoom position 21 shown in FIG. 4, and when the taking lens 12 is in process of being retracted as shown by the zoom position 20, a picture cannot be taken.

Figure 11:
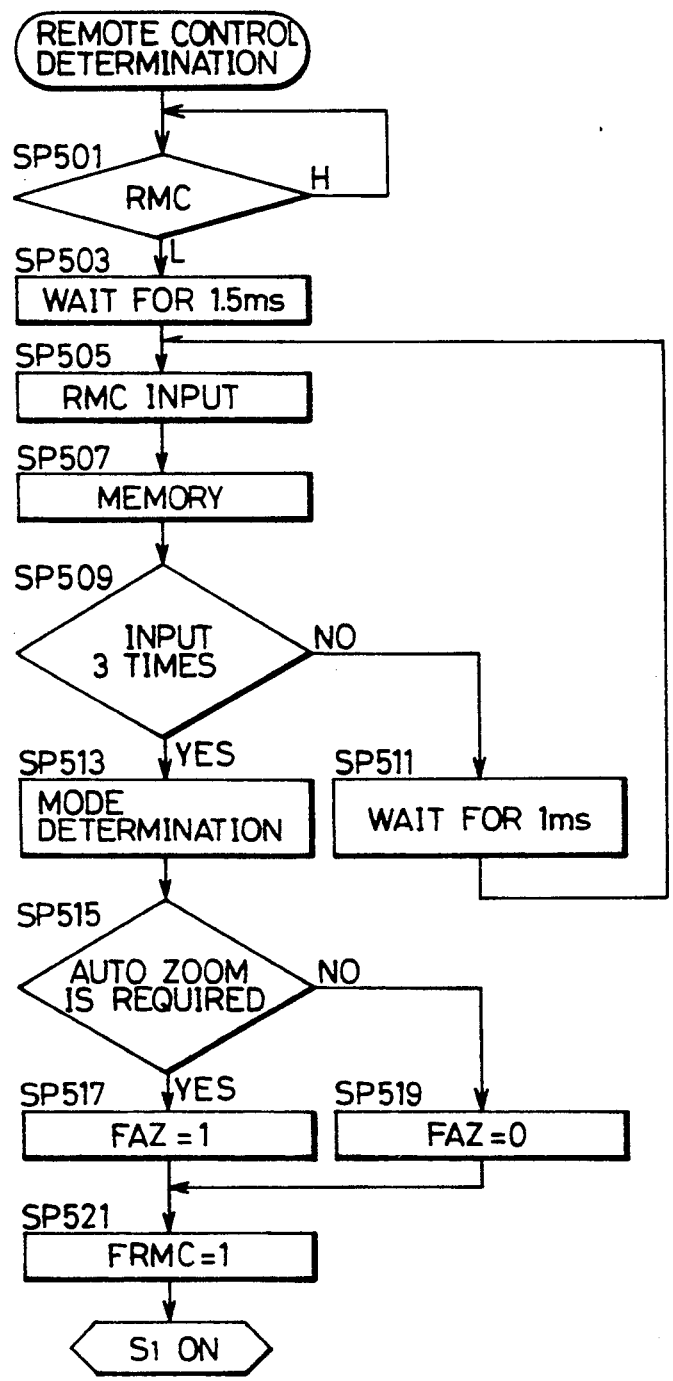
FIG. 11 is a flow chart showing a remote control determination subroutine.

Referring now to FIGS. 10A to 11, determination by the remote control signal will be described. Referring first to FIG. 10A, a waveform of the remote control signal will be described. This figure represents the reception signal RMC in the case of receiving the remote control signal.

First in a period of 10 ms, the signal attains H level (to be a remote control start signal). The period of 10 ms is sufficiently long compared with time required for determination of each switch in the above-described main routine. In response to this signal, the control CPU 1 advances the program to the remote control determination routine. Next, in 1 ms, the signal attains L level and subsequently in response to the signal changed to H level or L level for 1 ms, remote control mode data is transmitted in three bits. The remote control mode data and the contents thereof are shown in FIG. 10B. For example, if the remote control mode data is 000, the camera does not perform auto zoom and performs only release operation. If the remote control mode data is 001, 010, 011, 100, release operation is performed after auto zoom is performed. In this case, the release operation is performed after a size of an object is set to a size desired by the photographer by auto zoom according to the content of the data (as described afterwards). Those signals correspond to the operation switches S13 to S17 on the above-described lens cap in a one-to-one relation, and the photographer can select those signals in an arbitrary manner.

Referring next to FIG. 11, the flow chart of the remote control determination routine will be described. First in step SP501, there is a wait until the reception signal RMC attains L level. When it attains L level after the remote control start signal of 10 ms is supplied, the program proceeds to step SP503, where the control CPU 1 waits for 1.5 ms. Then, the reception signal RMC is supplied as input and stored in memory (in steps SP505, SP507). Next, it is determined whether a signal of three bits is received or not. If it is not received yet, the program proceeds to step SP511, where the control CPU 1 waits for 1 ms, and then the program proceeds to step SP505 to repeat the above-described operation. If the signal of three bits is received, the program proceeds from step SP509 to step SP513 to determine the mode as described above in connection with FIG. 10B. Subsequently, it is determined whether auto zoom is required or not (in step SP515), and an auto zoom flag FAZ is set or reset according to the result of the determination (in steps SP517, SP519). The auto zoom flag FAZ is a flag for performing auto zoom even in the remote control mode, and it is set to 1 when auto zoom is required. Next, a remote control flag FRMC is set to 1 (in step SP521) and the program proceeds to the below-described switch S1 on routine. The remote control flag FRMC is a flag used to store release by remote control and it is set to 1 in the case of release by remote control. According to the present invention, the camera is structured so that a desired photographing magnification can be selected by remote control; however, the camera may be structured so that auto zoom is unavailable at the time of remote-controlled photographing. In such a manner, communication of the remote control signal can be simplified and the remote control transmitter has a simple structure.

Figure 12:
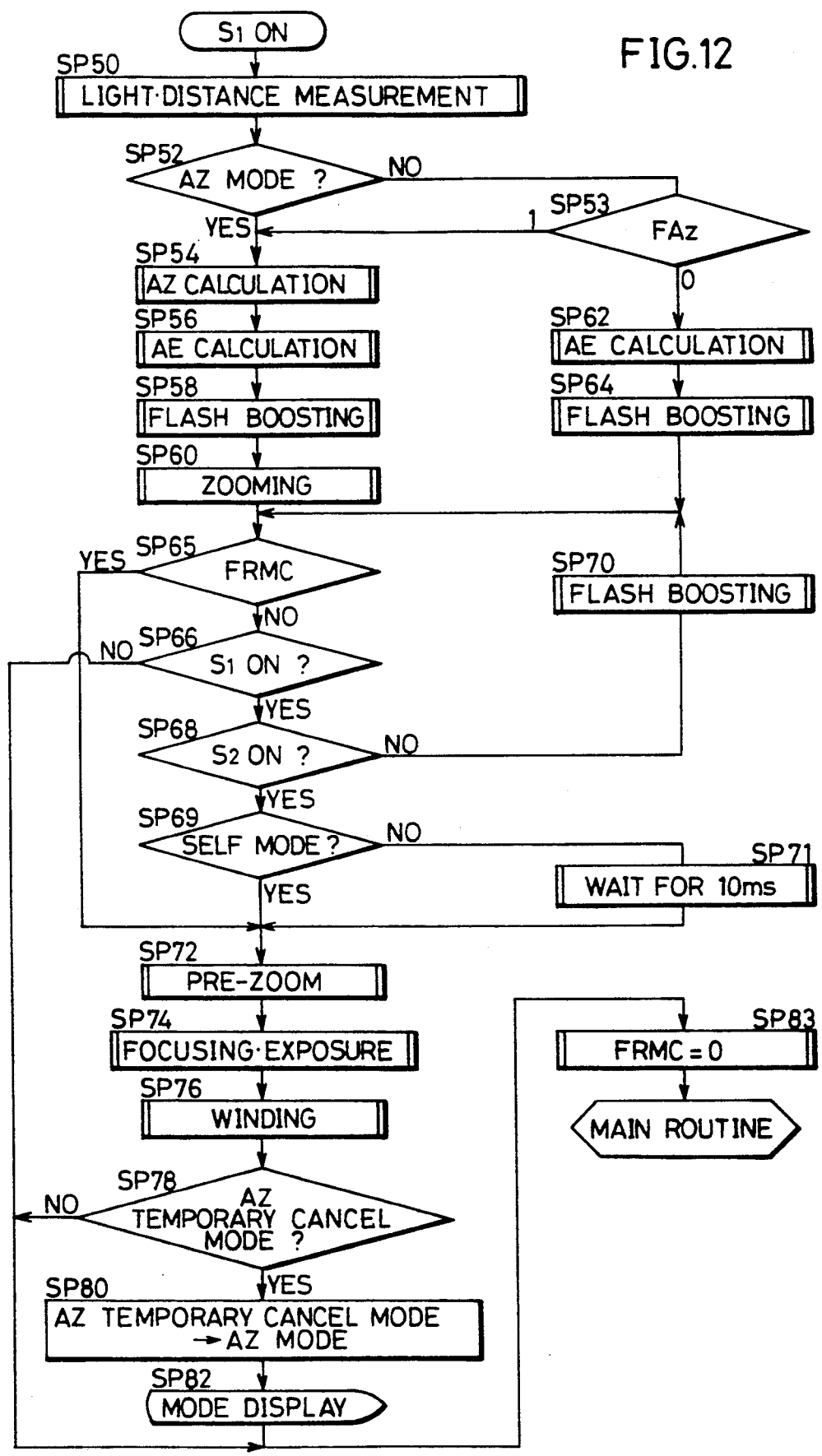

Next, the processing with the light measurement switch S1 being depressed or with release by remote control being performed will be described with reference to FIG. 12. When the light measurement switch S1 is turned on at the first stroke of the release button 11, or when a remote-controlled release signal is received, the processing flow proceeds to the light measurement distance measurement subroutine (in step SP50) and then it is determined whether the AZ mode is set or not (in step SP52). If it is determined that the AZ mode is set, an AZ calculation subroutine (in step SP54), an automatic exposure (AE) calculation subroutine (in step SP56), a flash boosting subroutine (in step SP58) and a zooming subroutine (in step SP60) are executed. The above-mentioned AE calculation (in step SP56) is performed based on the zoom position defined by the result of calculation of the AZ calculation subroutine (in step SP54). If it is determined in step SP52 that the AZ mode is not set, it is determined in step SP53 whether the auto zoom flag FAZ is 1 or 0. If the flag FAZ is 1, the program proceeds to step SP54 to perform the above-described operation. If the flag is 0, an AE calculation (in step SP62) is performed without effecting the AZ calculation, and flash boosting (in step SP64) is carried out. After the zooming subroutine (in step SP60) in the case of the AZ mode or after the flash boosting (in step SP64) if the AZ mode is not selected, it is determined in step SP65 whether release by remote control is instructed or not. If release by remote control is not instructed, it is determined whether the light measurement switch S1 is still on or not (in step SP66). If the light measurement switch S1 is on, it is determined whether the release switch S2 is on or not. If the release button S2 is off, flash boosting is carried out again (in step SP70) and the processing flow proceeds to step SP66. If it is determined in step SP68 that the release button S2 is on, or if it is determined in the above-mentioned step SP65 that release by remote control is instructed, it is determined in step SP69 whether the self mode is set or not. If the self mode is set, the control CPU 1 waits for 10 s (in step SP71). If the self mode is not set, the program immediately proceeds to the next step. Then, pre-zooming (in step SP72) (to be described afterwards) for fine zooming is carried out to ensure a sufficient resolution and after a focusing/exposure subroutine (in step SP74) and winding for one frame (in step SP76), it is determined whether the AZ temporary cancel mode is set or not (in step SP78). If the Az temporary cancel mode is set, the photographing mode changes from the AZ temporary cancel mode to the AZ mode (in step SP80) and the mode in that case is displayed on the liquid crystal display LCD15. Then, the remote control flag FRMC is reset to 0 (in step SP83) and the program returns to the main routine. If the light measurement switch S1 is off in step SP66, or if the AZ temporary cancel mode is not set in step SP78, the flag FRMC is also reset to 0 and then the program returns to the main routine.

As to the mode display method in the display LCD15, the auto zoom mode display segment 151 (in FIG. 6(d)) is turned on if the AZ mode is set and, if the AZ temporary cancel mode is set, the auto zoom mode display segment 151 blinks with a frequency of 2 Hz.

The AZ temporary cancel mode is used in cases as described below. For example, if the AZ mode is set, the size of an object (the photographing magnification) is defined by the camera. However, it may happen that the photographer does not like the size thus defined. In such a case, if the zoom operation lever 14 is operated, the AZ temporary cancel mode is set and it is possible to change the size of the object by using the lever in the same manner as in normal zooming.

Figure 13:
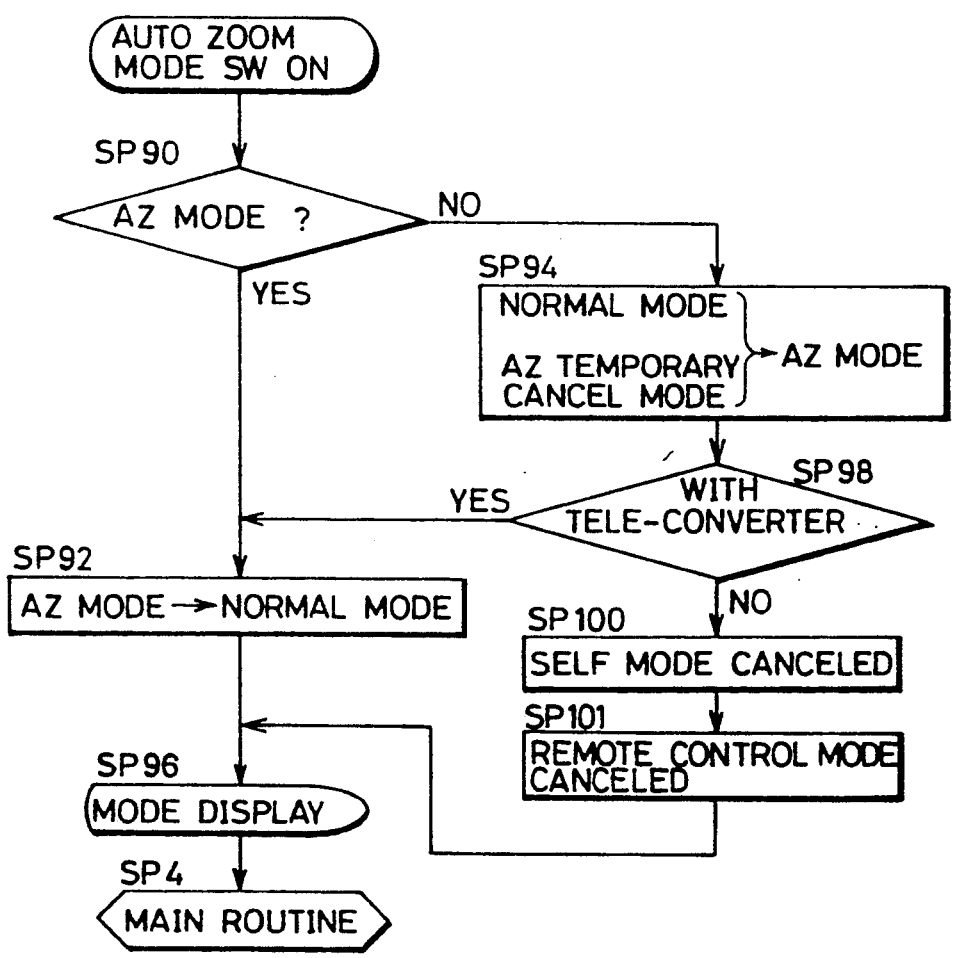

FIG. 13 shows a subroutine with the auto zoom mode switch S3 being on. Referring to FIG. 13, when the auto zoom mode switch S3 is turned on, it is determined whether the AZ mode is set or not (in step SP90). If it is determined that the AZ mode is set, the photographing mode changes from the AZ mode to the normal mode (in step SP92). If it is determined in step SP90 that the AZ mode is not set, the photographing mode changes to the AZ mode (in step SP94) if it has been the normal mode or the AZ temporary cancel mode. Then, it is determined whether a tele converter is attached to the zoom lens or not (in step SP98). If is determined that the tele converter is attached thereto, the processing flow proceeds to step SP92. If the tele converter is not attached thereto, the self mode is canceled irrespective of whether the self mode is set or not (in step SP100). The remote control mode is also canceled (in step SP101). Then, the processing flow proceeds to the mode display in step SP96, so that the photographing mode set in that case is displayed as shown in FIG. 6.

The determination in step SP98 as to whether the tele converter is attached or not is made dependent on the on or off state of the tele converter switch S11 which is changed in response to attaching or detaching of the tele converter and which is disposed near the taking lens 12. The reasons for the switching from the AZ mode to the normal mode in the case of the determination in step SP98 that the tele converter is attached are as follows. In a camera where the lens cannot be exchanged, as in the present embodiment, a front converter is generally used and such a front converter is large and heavy. Consequently, if zooming is carried out with such condition, the load applied to the zoom motor M1 increases and the zooming speed becomes slow. Therefore, the time required for auto zoom is prolonged and the time lag, which is defined as a time period until the completion of the exposure after depression of the release button, is increased. As a result, it is not possible to take pictures with good timing.

Figure 14:
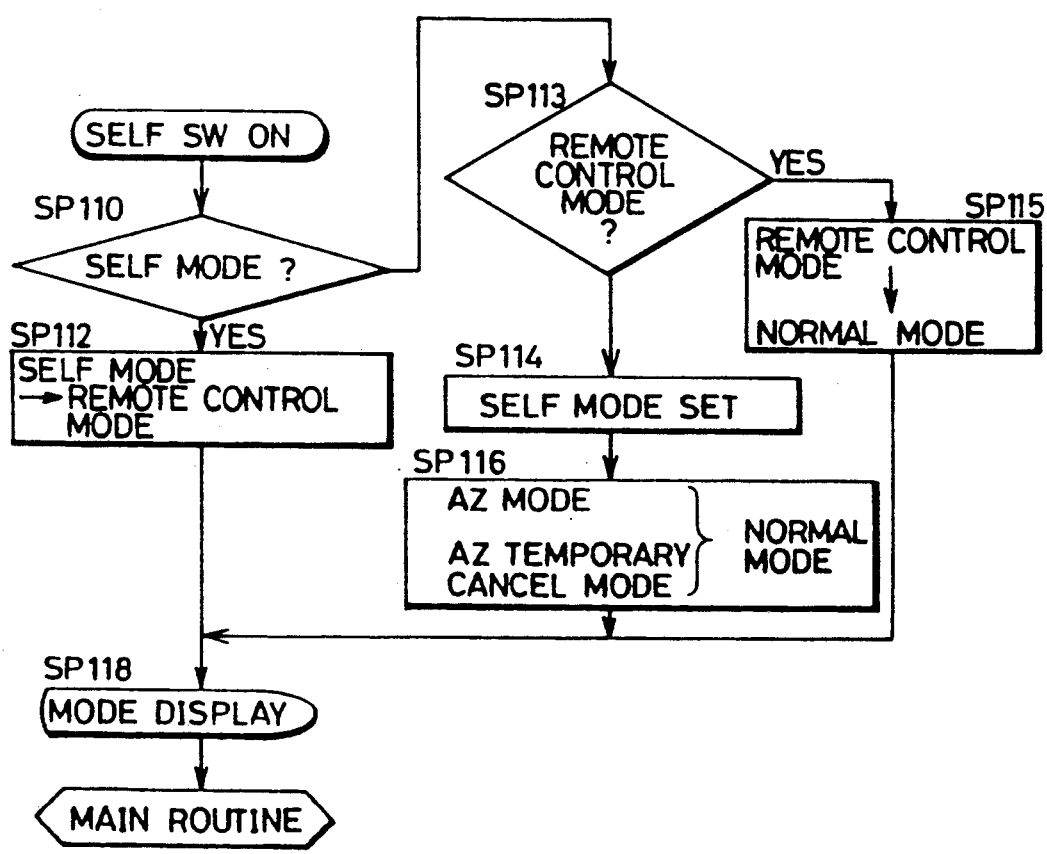

Next, referring to FIG. 14, the subroutine with the photographing mode switch S12 being on will be described. If the photographing mode switch S12 is on, it is determined at first whether the self mode is set or not (in step SP110). If the self mode is set, the mode switches from the self mode to the remote control mode (in step SP112). If the self mode is not set, it is determined whether the remote control mode is set or not (in step SP113). If the remote control mode is not set, that is, if the normal mode is set, the self mode is set (in step SP114) and the photographing mode changes from the AZ mode or the AZ temporary cancel mode to the normal mode (in step SP116). Then, the program proceeds to step SP118. If the remote control mode is set, the photographing mode changes from the remote control mode to the normal mode (in step SP115) and the program proceeds to step SP118. Then, the photographing mode thus set is displayed on the display LCD as shown in FIG. 6 (in step SP118). After that, the processing flow proceeds to the main routine. Thus, simultaneous setting of the self mode, the remote control mode and the AZ mode or the AZ temporary cancel mode is not effected. It is possible however to perform auto zoom in the remote control mode.

Figure 15:
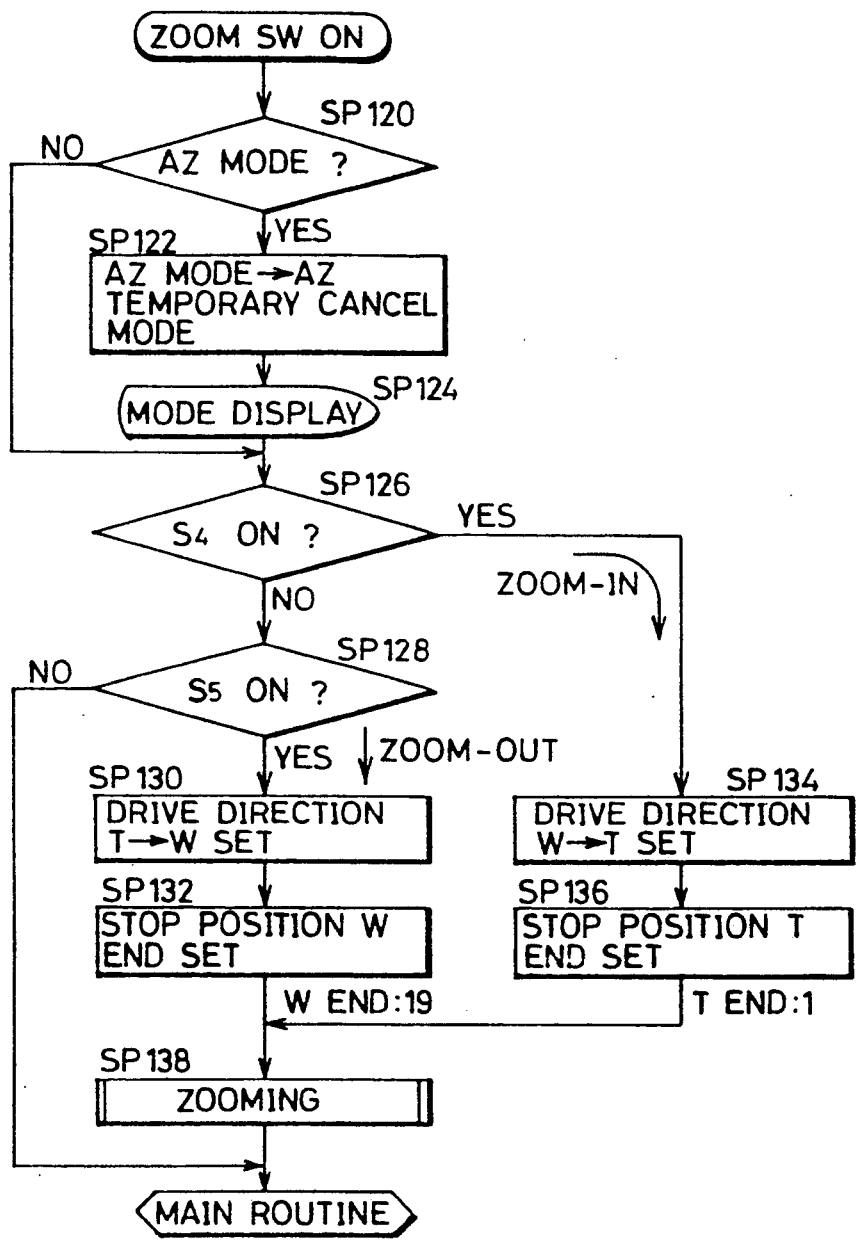

FIG. 15 shows a subroutine in which the zoom operation lever 14 shown in FIG. 2A is operated to turn on either the zoom-in switch S4 or the zoom-out switch S5. When either the zoom-in switch S4 or the zoom-out S5 is turned on, it is determined whether the photographing mode is the AZ mode or not (in step SP120). If it is the AZ mode, the photographing mode is switched from the AZ mode to the AZ temporary cancel mode (in step SP122) and the mode is displayed (in step SP124). If it is determined in step SP120 that the photographing mode is not the AZ mode or after the mode display is effected in step SP124, it is determined whether the zoom-in switch S4 is on or not. If the zoom-in switch S4 is on, the direction of drive of the taking lens 12 is set to the tele direction (in step SP134) and the stop position of the taking lens 12 is set to the tele end (in step SP136). If the zoom-in switch S4 is not on, it is determined whether the zoom-out switch S5 is on or not. If the zoom-out switch S5 is on, this means that zoom-out operation is instructed and accordingly the drive direction of the taking lens 12 is set to the wide direction (in step SP130) and the stop position of the taking lens 12 is set to the wide direction (in step SP130) and the stop position of the taking lens 12 is set to the wide end (in strep SP132). After the position of the taking lens 12 is set to either of the above mentioned ends, the processing flow proceeds to the zooming subroutine (in step SP138). If the zoom-out switch S5 is off in step SP128, or after zooming is terminated in step SP138, the processing flow returns to the main routine.

If both of the zoom-in switch S4 and the zoom-out switch S5 are off in steps SP126 and SP128, this case occurs for example when an error signal such as noise is inputted. The set stop position of the taking lens 12 is stored in the RAM of the control CPU 1 as zoom position data shown in FIG. 4 in the same manner as in steps SP34 and SP40 in FIG. 9.

Figure 16:
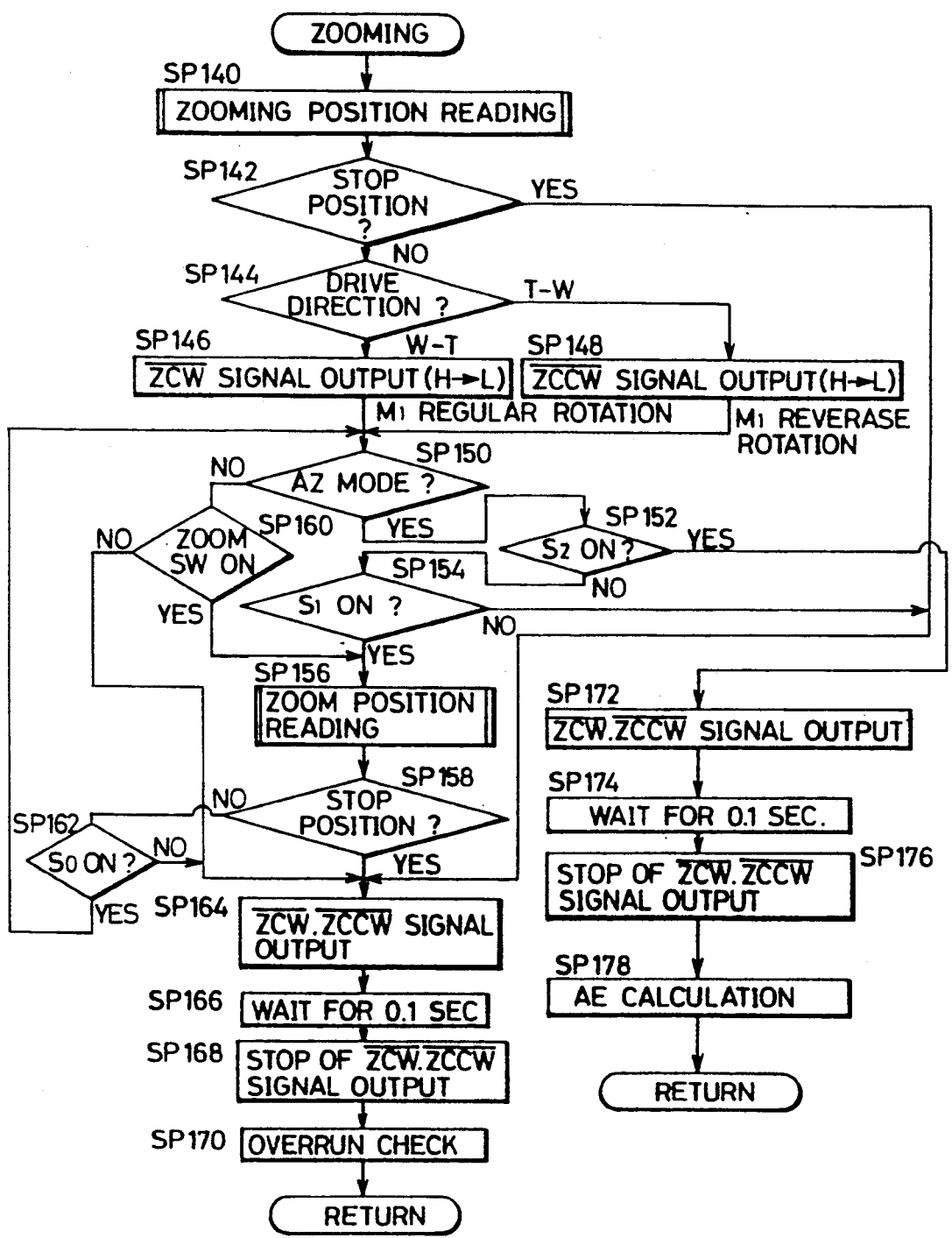
FIG. 16 is a flow chart showing a zooming subroutine.

Next, referring to FIG. 16, the zooming subroutine will be described. When the zooming subroutine is called, the zoom position is read at first (in step SP140) and it is determined whether the taking lens 12 reaches either stop position, i.e., the wide end or the AZ stop position, which is calculated in the AZ calculation in step SP54 in FIG. 12 (in step SP142). If it is determined that the taking lens 12 does not reach the stop position, the signal $\overline{ZCW}$ is supplied if the direction of drive of the taking lens 12 is the tele direction (in step SP146)

and the zoom motor M1 is rotated in the regular direction. If the drive direction is the wide direction, the signal $\overline{ZCCW}$ is supplied (in step SP148) and the zoom motor M1 is rotated in the reverse direction, and it is determined whether the AZ mode is set or not (in step SP150). If it is determined in step SP150 that the AZ mode is set, it is determined whether the release switch S2 is on or not (in step SP152). If the release switch S2 is off, it is determined whether the light measurement switch S1 is on or not (in step SP154). If the light measurement switch S1 is on in step SP154, the zoom position is read (in step SP156) and it is determined whether the taking lens 12 reaches the stop position or not (in step SP158). If it is determined in step SP150 that the AZ mode is not set, it is determined whether the zoom-in switch S4 or the zoom-out switch S5 is on (in step SP160). If either switch is on, the processing flow proceeds to the zoom position read subroutine (in step SP156). If it is determined in step SP158 that the taking lens 12 is not at the stop position, it is determined whether the main switch S0 is on or not. If it is determined that the main switch S0 is on, the processing flow returns to step SP150.

If it is determined in step SP160 that the switches S4 and S5 are not on, or if it is determined in step SP162 that the main switch S0 is off, the processing flow proceeds to step SP164 to brake the zoom motor M1. If it is determined in step SP152 that the release switch S2 is on, the brake is applied to the zoom motor M1 (in step SP172) and there is a wait for 0.1 second (in step SP174). Then, the output of the brake signal to the zoom motor M1 is stopped (in step SP176) and AE calculation is performed (in step SP178). In this case, since the taking lens 12 is not moved to the desired position (AZ stop position) for photographing the object although the AZ mode is set, AE calculation is performed again at the zooming stop position. This is because the open F value of the taking lens 12 differs dependent on the zoom position.

If it is determined in step SP154 that the light measurement switch S1 is not on, the processing flow proceeds to step SP164 to apply the brake to the zoom motor M1. More specifically, referring to steps SP150, SP152, SP154 and SP164, if the light measurement switch S1 is turned off even during the zooming in the AZ mode, the brake is immediately applied to the zoom motor M1 and thus the start and stop of auto zoom operation can be controlled at the user's will. Consequently, it is possible to provide a camera having the auto zoom function in which no delay in timing occurs in photographing operation of the camera and the user can take photographs without feeling any disagreement.

The reason that the signals $\overline{ZCW}$, $\overline{ZCCW}$ are supplied to apply the brake to the zoom motor M1 in step SP164 is that both of the output signals are caused to be L as shown in Table 1, thereby braking the motor.

When the brake is applied to the zoom motor M1, the brake continues for 0.1 second (in step SP166) and the drive of the zoom motor M1 is stopped (in step SP168). Then, the processing flow proceeds to an overrun check subroutine (in step SP170) to determine whether an overrun of the taking lens 12 occurs beyond a predetermined position.

Figure 17:
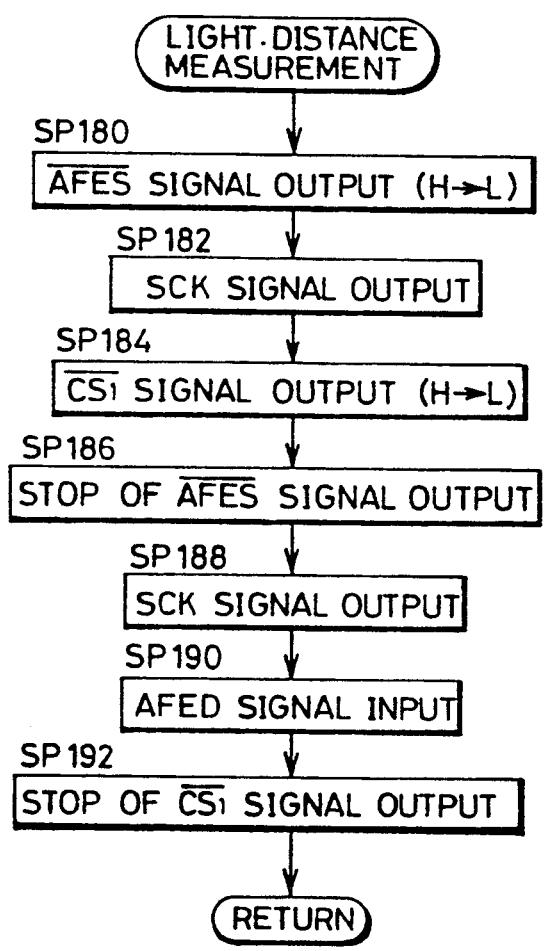
FIG. 17 is a flow chart showing a light measurement-distance measurement subroutine.

Next, referring to FIG. 17, the light measurement-distance measurement subroutine will be described. In the light measurement-distance measurement subroutine, at first, a signal $\overline{AFES}$ is supplied to turn on the light measurement-distance measurement circuit (in step SP180). Then, a serial aerial communication clock signal SCK is supplied as operation clock pulses for A/D conversion (in step SP182) and after output of predetermined clock pulses, a signal $\overline{CS1}$ for designating a data destination is outputted (in step SP184). The output of the signal $\overline{AFES}$ is stopped (in step SP186) to set light measurement-distance measurement data and the serial communication clock signal SCK is outputted (in step SP188). In synchronization, a signal AFED for reading the light measurement-distance measurement data is inputted (in step SP190) and after an end of reading of the light measurement-distance measurement data, the output of the signal $\overline{CS1}$ for turning off the light measurement-distance measurement circuit is stopped (in step SP192).

The timing of the signals in the above described light measurement and distance measurement operation, as well as the data related with this operation will be described with reference to FIG. 18. First, referring to (1) of FIG. 18, when the signal $\overline{AFES}$ attains L level, light measurement and distance measurement operation is started. In synchronization with the signal $\overline{AFES}$ at L level, the signal SCK as the operation clock signal of the light measurement-distance measurement circuit generates 512 pulses for one cycle. During this period, the values obtained by light measurement and distance measurement are converted from the analog values to digital data. When the signal $\overline{CS1}$ falls to L level, the signal AFED is supplied to the control CPU 1 in synchronization with the pulse signal SCK in the order of measured light data and measured distance data. Those data are transferred both as 8-bit serial data. A relation between the serial communication clock pulses SCK and the signal AFED supplied at that time in the case of supplying the measured light data is shown for example in an enlarged manner in the lower part in (1) of FIG. 18. Referring to the illustration of the signal AFED, measured light data of one bit is transmitted for each cycle of the signal SCK. Details of the measured light data and the measured distance data are shown in (2) of FIG. 18. Referring to (2), the measured light data is data of eight bits in which more significant five bits represent an integer and less significant three bits represent a decimal part. This data is a BV value which represents luminance of an object. The distance measurement data is data of eight bits in which only less significant five bits are used. This distance data indicates a distance to an object represented by a predetermined zone number. FIG. 19 shows a relation between the distance to the object and the zone number as the distance data.

Figure 20:
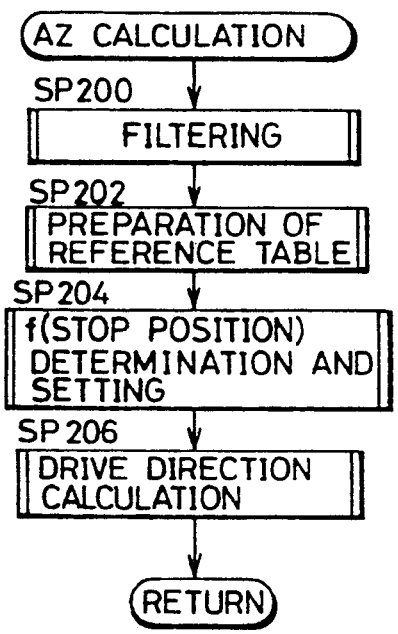
FIG. 20 is a flow chart of an AZ calculation subroutine.

FIG. 20 is a flow chart showing an AZ calculation subroutine. Referring to FIG. 20, when the processing flow proceeds to the AZ calculation subroutine, filtering is effected at first (in step SP200) and a reference table is prepared (in step SP202).

This filtering is effected for the below described purposes. If auto zoom operation is continuously performed, it happens that the main object comes outside an area of distance measurement. If the object is outside the area of distance measurement, a distance to the background is measured and a zoom state is set to a case in which the object is at the infinite distance, causing lack of smoothness in zooming operation. Particularly, in case of moving objects, such phenomenon will be liable to occur. Therefore, the distance data is filtered so as to nullify the distance data not related with the main object, whereby zooming operation can be carried out smoothly.

The method of filtering may include for example a method in which if the same data is obtained for a plural number of times, the data is rendered valid. More specifically, if discontinuous data exists among plural continuous data, such discontinuous data is rendered invalid. However, this case cannot be applied to cases in which an object moves in the back-and-forth direction with respect to the camera. Another method may be considered in which the present distance data is compared with the previous data and if the difference is larger than a prescribed value, the present data is rendered invalid. According to the second method, even if an error of about ±1 zone exists in the distance data in the distance measurement circuit, such error can be absorbed.

Next, the reference table will be described. The reference table is used to refer to a zoom stop position in the AZ mode based on the distance to the object. An example of the reference table is shown in FIG. 21. Referring to FIG. 21, the reference table includes a table (1) and a table (2). The table (1) is used to refer to a prescribed parameter D based on the data representing prescribed distance as the related zone number. The parameter D represents a real distance in mm. A focal length f is obtained by calculating a product of the parameter, which corresponds to the filtered distance data (zone No.), and predetermined photographing magnification data $\beta$. The table (2) represents the stop position of the taking lens 12 in the AZ mode as the zoom position based on the focal length f obtained by the calculation. Tables (1) and (2) are both prepared in the RAM of the control CPU 1.

In the remote control mode, an auto zoom photographing magnification for an object can be selected according to the content of the received signal. A suitable photographing magnification $\beta$ is set according to the number of persons (one person, two persons, three persons or many persons) to be photographed. For example, if the number of persons as the object is one, the photographing magnification is 1/30; if the number of persons is two, the photographing magnification is 1/50; if the number is three, the photographing magnification is 1/70; and in the case of many persons, the photographing magnification $\beta$ is 1/120. The focal length f is obtained by calculating a product of each of the photographing magnifications $\beta$ and the parameter D. FIG. 22 shows examples of pictures taken by auto zoom in the remote control mode as described above.

Returning to the AZ calculation routine in FIG. 20, the stop position corresponding to the calculated focal length f is defined and set (in step SP204) and the drive direction of the taking lens 12 is calculated (in step SP206). The calculation of the drive direction is effected by comparing the present stop position of the taking lens 12 and the stop position corresponding to the obtained focal length f, using the stop position in Table (2) shown in FIG. 21.

Figure 23:
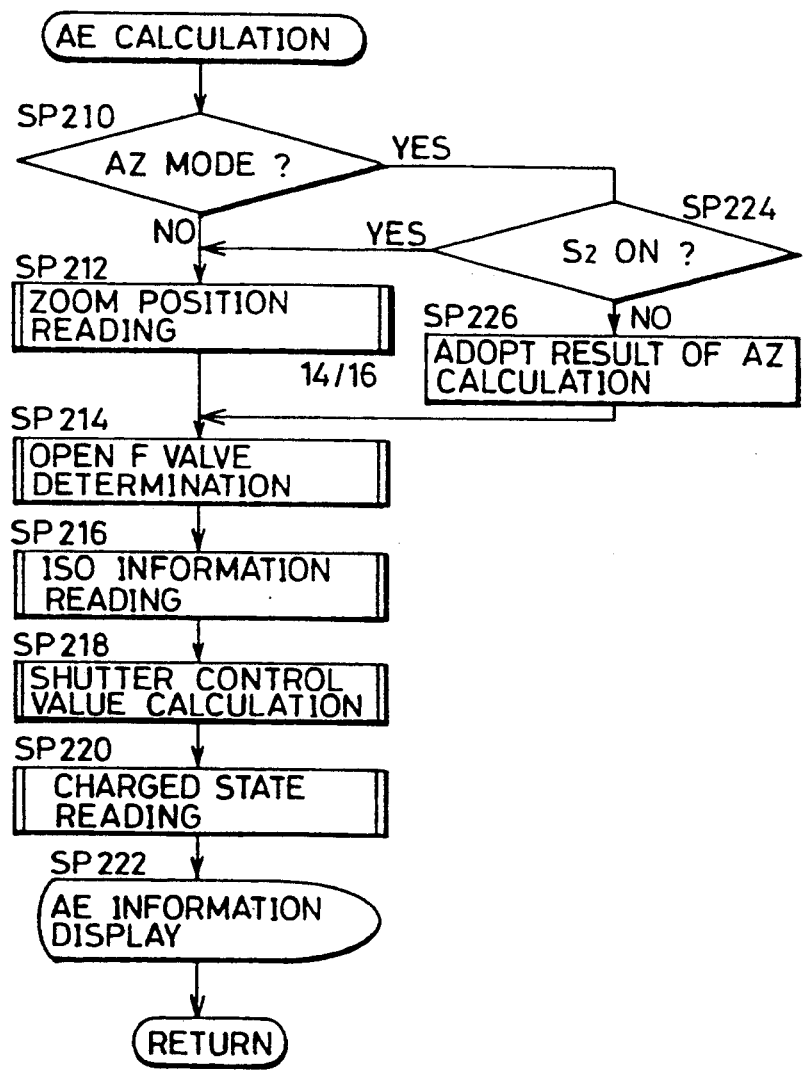
FIG. 23 is a flow chart showing an AE calculation subroutine.

Next, the AE calculation subroutine will be described. FIG. 23 is a flow chart of the AE calculation subroutine. Referring to FIG. 23, in the AE calculation subroutine, it is determined at first whether the photographing mode is the AZ mode or not (in step SP210). If it is the AZ mode, it is determined whether the release switch S2 is on or not (in step SP224). If the photographing mode is not the AZ mode or the release switch S2 is on, the zoom position is read (in step SP212). The determination in step SP224 as to whether the release switch S2 is on or not is made for the purpose of determining whether the photographing operation is to be performed by assigning priority to release operation.

After the zoom position is read in step SP212, the open F value is determined. This is because the open F value differs dependent on the zoom position of the taking lens 12. If the release switch S2 is off in step SP224, the stop position calculated in the Az calculation is adopted (in step SP226) and the processing flow proceeds to step SP214. FIG. 24 is Table (3) showing a relation between the zoom position and the open F value (AV0). The Table (3) is provided in a ROM or the RAM in the control CPU 1.

Returning to the AE calculation subroutine, after the open F value is defined, ISO information is read (in step SP216) and a shutter control value is calculated (in step SP218). A charged state of the flash unit is read (in step SP220) and after that, other AE information such as the aperture value and shutter speed is displayed in the finder (in step SP222).

Figures 25A, 25B:
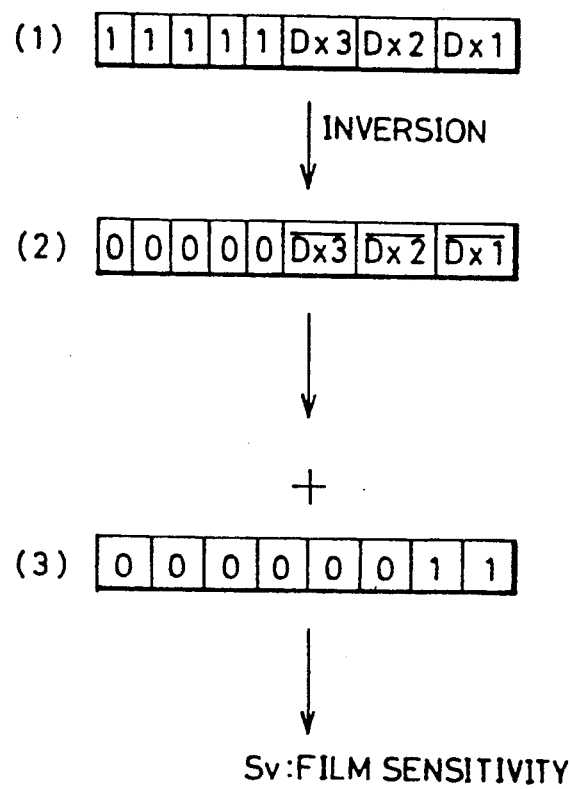
FIGS. 25A and 25B are diagrams for explaining processing for reading information of film sensitivity.

FIGS. 25A and 25B are diagrams for specifically explaining the reading of the ISO information in step SP216 in FIG. 23. The ISO sensitivity representing the sensitivity of a film and the corresponding ISO code are shown in FIG. 25A. The ISO sensitivity is represented with a value Sv, which is indicated in parentheses after the related ISO sensitivity. The method of conversion from an ISO code to the corresponding $S_v$ value will be described with reference to FIG. 25B. When the ISO information is to be read, the less significant three bits out of the eight bits of the ISO code are read. In this case, the data of the more significant five bits is 1. This state is shown in FIG. 25B (1). Then, the data shown in (1) is inverted to data shown in (2) in FIG. 25B. Then, 03H is added to the data as shown in (3) in FIG. 25B and the data thus obtained is converted to a film sensitivity $S_v$ value. The value thus obtained finally corresponds to a numerical value indicated in parentheses after each ISO sensitivity value in the film sensitivity table of FIG. 25A.

Next, the shutter control value calculation in step SP218 in FIG. 23 will be described. A shutter control value $EV_c$ is represented as follows.

$$EV_c = BV + S_v - (AV(f_x) - AV_0(f=38)) \quad (1)$$

This shutter control value EV corresponds to a focal length $f_x$. In the above indicated equation (1), the respective elements are as follows.

$EV_c$: shutter control value

Figure 18:
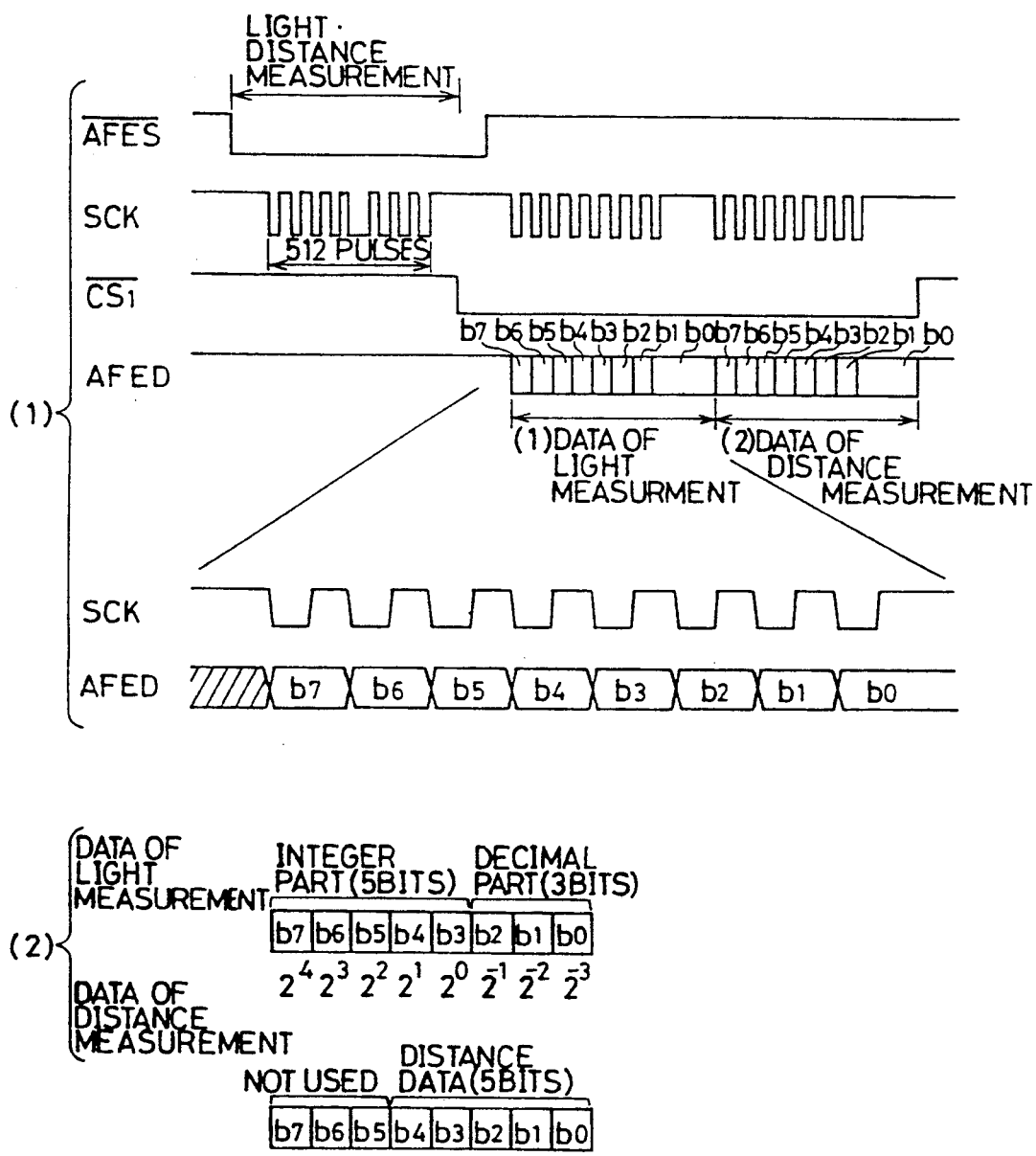
FIG. 18 is a timing chart of signals for light measurement and distance measurement.

BV: measured light data indicating luminance of an object (see FIG. 18)

SV: film sensitivity (see FIG. 25)

$AV(f_x)$ : open f value with the zoom position (focal length) $f_x$ mm $AV_0(f=38)$: open f value with the focal length of 38 mm, i.e., at the wide end The control EV value represents a control EV value with the taking lens 12 at the wide end. If the calculated value $EV_c$ is smaller than a threshold value $EV_{TH}$ for determining whether a flash mode is to be set or not, the photographing mode is automatically set to the flash mode.

Next, the AE calculation in the flash mode will be described. In the AE calculation in the flash mode, a flash AV value $AV_T$ is obtained by the below indicated equation.

$$AV_T = IV + S_V - DV - (AV(f_x) - AV(f=38)) \quad (2)$$

where

IV: flash illuminance represented by a logarithm of a guide number

DV: distance to an object represented by a logarithm of a distance

The flash AV value $AV_T$ in the flash mode calculated as described above is converted to a shutter control value by the below indicated equation.

$$EV_C = F(AV_T) \quad (3)$$

where $F(AV_T)$ represents a function.

Figure 26:
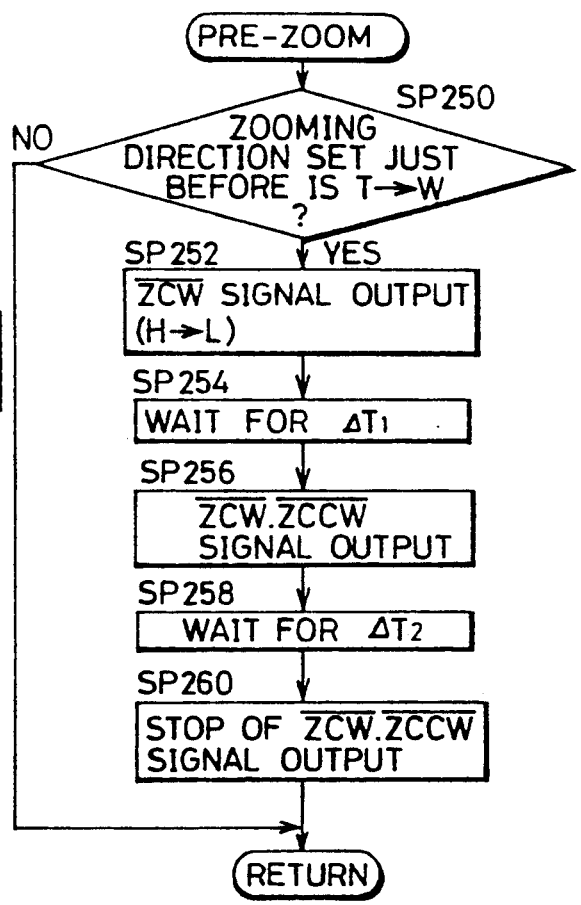
FIG. 26 is a flow chart of a pre-zoom subroutine.

FIG. 26 is a flow chart showing details of a pre-zoom subroutine. The pre-zoom is operation for reducing a gap of a pin 33 in a cam groove 31 of the lens barrel 21 constantly toward the same direction.

Figure 27:
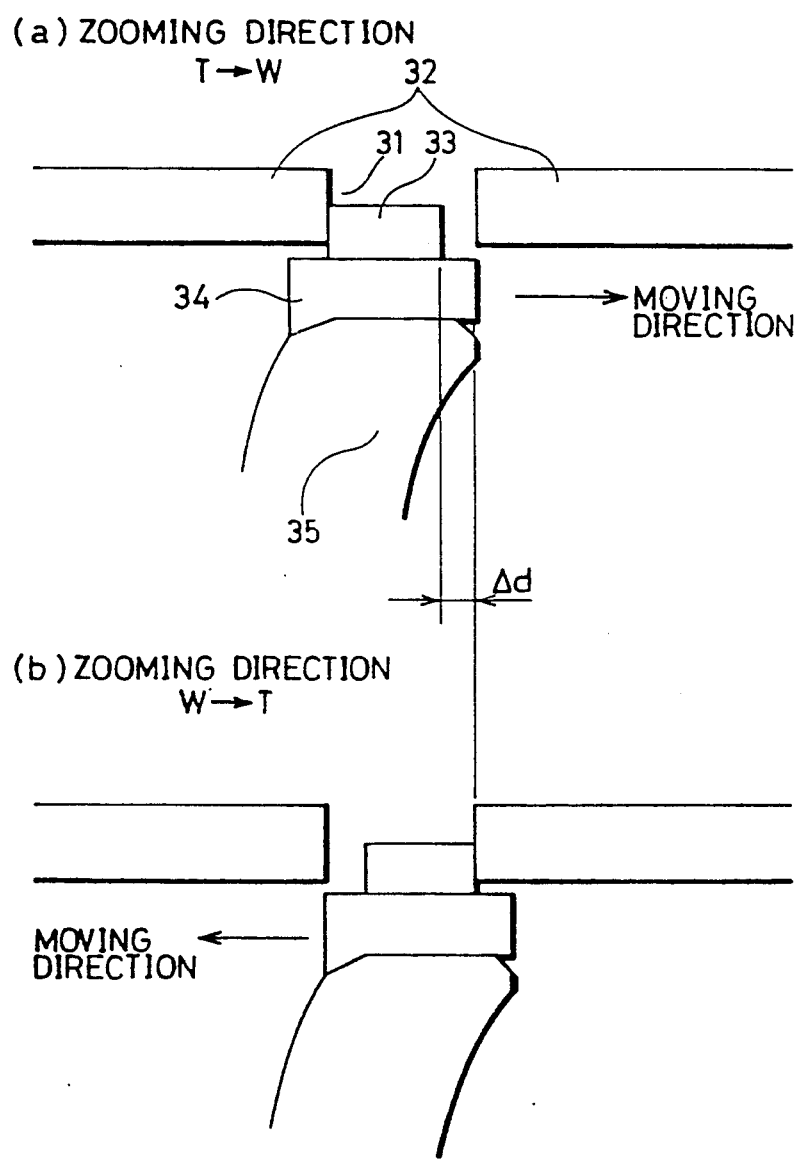
FIG. 27 shows a section of a lens barrel unit.

FIG. 27 shows a section of the lens barrel portion. Referring to FIG. 27, the lens barrel 21 is provided with a cam ring 32 which has the cam groove 31. In order to move the taking lens 12 to set a predetermined focal length, the pin 33 moves along the cam groove 31 with a lens frame 34 provided on the circumference of the taking lens 12. As shown in FIG. 27, the width of the pin 33 is smaller than that of the cam groove 31. Accordingly, a certain gap exists dependent on the moving direction of the taking lens 12 and even if the lens barrel 21 is rotated by the zoom motor M1, the quantity of rotation of the zoom motor M1 and the moving amount of the taking lens 12 are not proportional to each other. The upper part (a) of FIG. 27 indicates a positional relation between the pin 33 and the cam groove 31 in the case where the zooming direction is the wide direction, and the lower part (b) of FIG. 27 shows a positional relation in the case where the zooming direction is the tele direction.

Referring to (a) and (b) of FIG. 27, if the zooming direction is changed, and error Δd is caused in the lens position even in the case of the same zoom position, resulting in lowering of the optical characteristics. Therefore, if the zooming direction is the wide direction as shown in (a) of FIG. 27, fine zooming is effected toward the tele direction at an initial stage of release operation and the pin 33 is positioned constantly as shown in (b) of FIG. 27, whereby the error Δd in the lens position in the case of the same zoom position can be practically eliminated.

Returning to the flow chart of pre-zoom in FIG. 26, it is determined at first whether the zooming direction set just before is the wide direction or not (in step SP250). If so, it is necessary to carry out pre-zoom operation to eliminate the error Δd and thus a signal $\overline{ZCW}$ is supplied to rotate the zoom motor M1 in the regular direction (in step SP252). Then, there is a wait for a predetermined rotation time (ΔT1) (in step SP254) and in order to apply the brake to the zoom M1, the signals $\overline{ZCW}$, $\overline{ZCCW}$ are supplied (in step SP256). After a wait for a prescribed braking time (ΔT2) (in step SP258), the output of the signals $\overline{ZCW}$, $\overline{ZCCW}$ is stopped to turn off the zoom motor M1 (in step SP260). If it is determined in step SP250 that the zooming direction set just before is not the wide direction, it is not necessary to carry out pre-zoom operation and the processing flow returns.

The braking time (ΔT2) is shorter than a time (ΔTs) required for actually stopping the rotation of the motor M1. Thus, a time lag in release operation can be suppressed to the minimum. Practically, the zoom motor M1 is stopped during lens setting (d) to be described afterward. If the power supply for drive is structured by a constant voltage or constant current circuit, the moving amount of the taking lens 12 can be always maintained constant.

Figure 28:
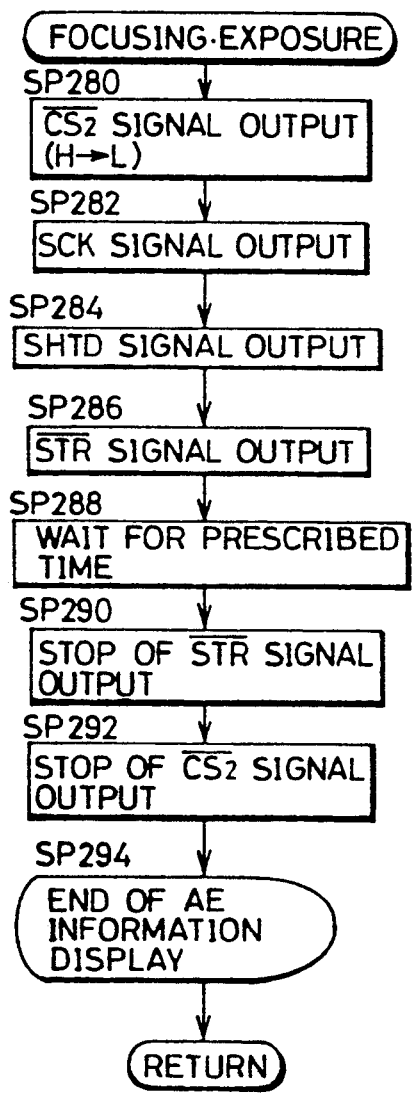
FIG. 28 is a flow chart of a focusing-exposure subroutine.

FIG. 28 is a flow chart showing the focusing-exposure subroutine. The focusing and exposure operations are performed only by transmitting focusing data and shutter control data to the shutter block 3 and supplying the signal $\overline{STR}$ instructing a start of focusing. Referring to FIG. 28, in the focusing-exposure subroutine, the signal $\overline{CS2}$ is supplied to designate a destination of data output and to turn on the shutter block 3 (in step SP280). Then, the signal SCK as the serial communication clock signal is supplied (in step SP282), the focusing data (the lens setting data) and the shutter control data are supplied (in step SP284), and the signal $\overline{STR}$ for instructing the start of focusing is supplied (in step SP286). Then, there is a wait for a prescribed time until completion of exposure (in step SP288) and after that the supply of the signal $\overline{STR}$ is stopped to turn off the shutter block 3 (in step SP290), the supply of the signal $\overline{CS2}$ is stopped (in step SP292), and the LED display in the finder not shown is turned off (in step SP294).

A flash trigger signal TRG (see the electric circuit diagram of FIG. 5 in the case of the flash mode is automatically supplied as output from the shutter block 3 to the flash block 5 when the bit 7 (b7) of the shutter control data is set.

Figure 29:
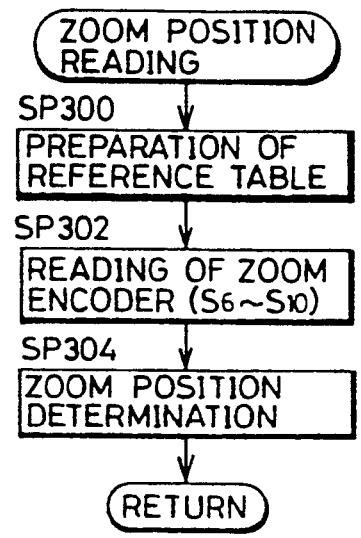
FIG. 29 is a flow chart of a zoom position reading subroutine.

Next, the zoom position reading subroutine will be described. FIG. 29 is a flow chart showing the zoom position reading subroutine. Referring to FIG. 29, in the zoom position reading subroutine, a reference table (4) is prepared at first (in step SP300). A hexadecimal signal is read from the zoom encoder (in step SP302) and the zoom position data is accessed by using the signal as an address, whereby the zoom position is determined (in step SP304).

FIG. 30 is a diagram showing the reference table (4) for zoom position reading described in step SP300 in FIG. 29. Referring to FIG. 30, an address is represented by the less significant five bits out of the eight bits. Next, the method of reading this table (4) will be described by taking an example. Assuming that 13H is read as a zoom encoder signal, a zoom position data 8 (a decimal number) is obtained by using the signal 13H as an address. In this case, the typical f value is 70 mm from the zoom encoder explanation diagram of FIG. 3. The zoom position data 0 indicates the position data which cannot be generated.

Figure 31:
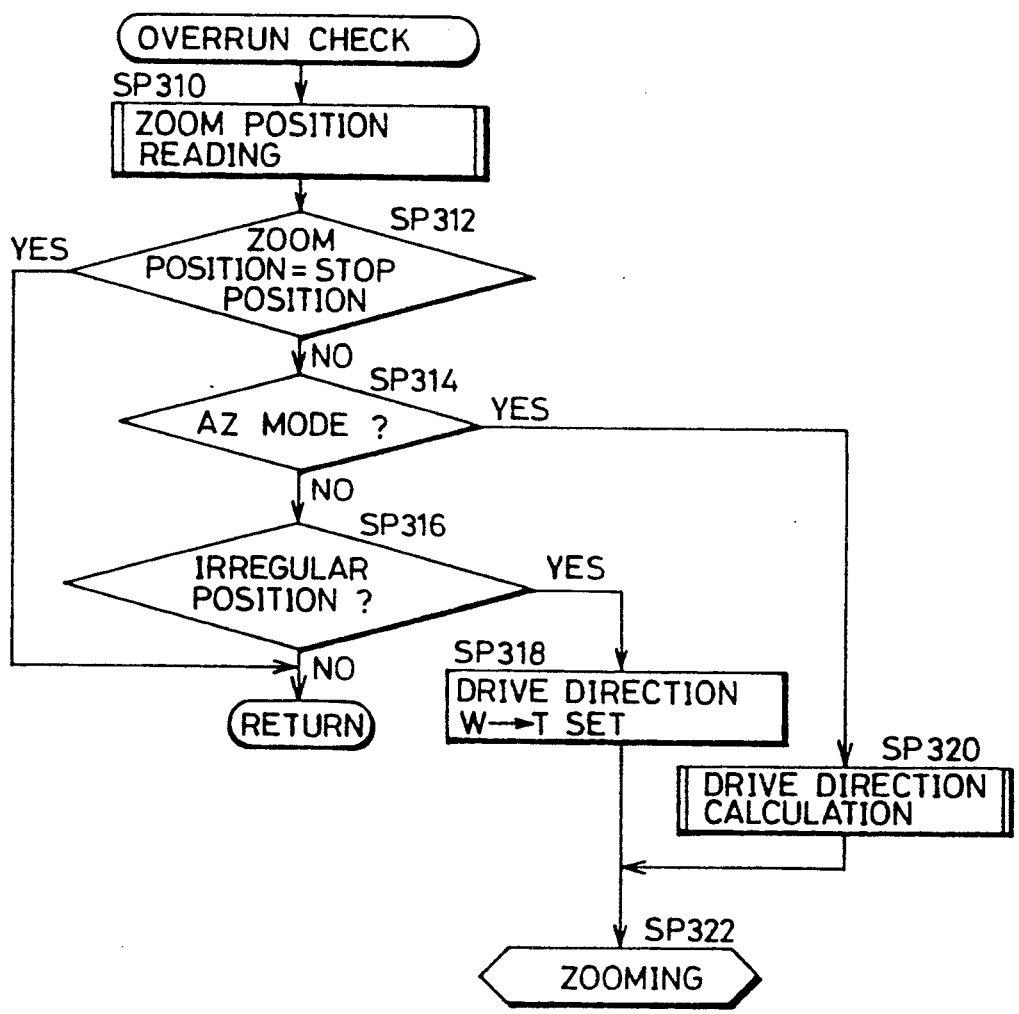
FIG. 31 is a flow chart showing an overrun check subroutine.

Next, the overrun check subroutine will be described. FIG. 31 is a flow chart showing the overrun check subroutine. In case of overrun of the taking lens 12, it is driven again to the desired position if the photographing mode is the AZ mode. If the photographing mode is not the AZ mode, the taking lens 12 is driven again only if it is in an irregular position. The irregular position of the taking lens 12 is a position from the wide end to the retracted position.

In the overrun check subroutine, first, the zoom position is read (in step SP310) and it is determined whether or not the read zoom position is the stop position of the taking lens 12 calculated in step SP204 in FIG. 20 (in step SP312). If it is not the calculated stop position, it is determined whether the photographing mode is the AZ mode or not (in step SP314). If it is not the AZ mode, it is determined whether the taking lens 12 is in the irregular position or not (in step SP316). If the taking lens 12 is not in the irregular position, the processing flow returns. If the zoom position read in step SP312 is the calculated stop position, the processing flow immediately returns. If it is determined in step SP314 that the propagating mode is the AZ mode, the drive direction is calculated from the calculated stop position and the read zoom position (in step SP320) and zooming operation is performed (in step SP322). If it is determined in step SP316 that the taking lens 12 is in the irregular position, the drive direction of the taking lens 12 is set to the tele direction (in step SP318) since exit from the irregular position is always made by driving the lens 12 toward the tele direction. Then, zooming operation is carried out (in step SP322).

Figure 32:
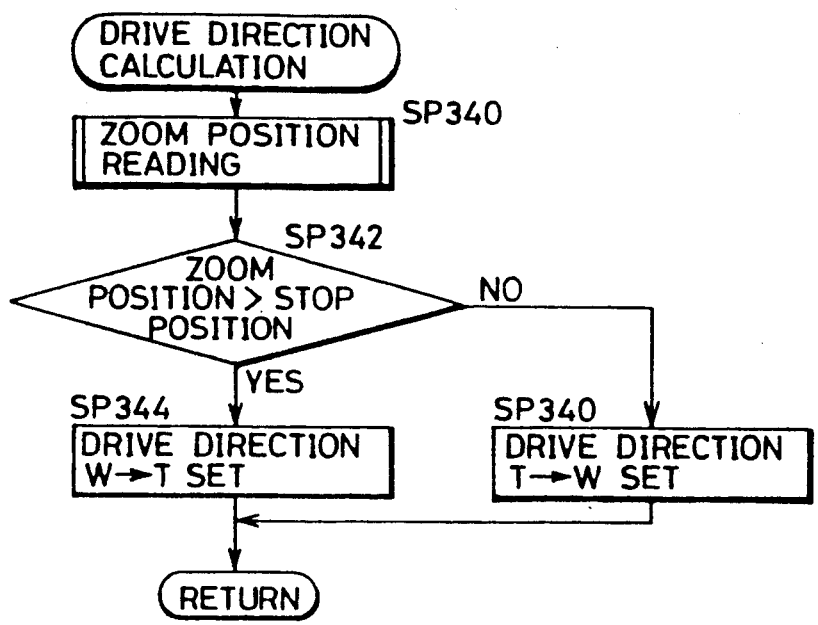
FIG. 32 is a flow chart showing a drive direction calculation subroutine.

Next, the drive direction calculation subroutine will be described. FIG. 32 is a flow chart of the drive direction calculation subroutine. Referring to FIG. 32, in the drive direction calculation subroutine, the zoom position is read at first (in step SP340). Next, it is determined by referring to the number of the stop position whether the number of the zoom position is larger than that of the calculated stop position (in step SP342). If it is determined that the number of the zoom position is larger than that of the calculated stop position, the drive direction is set to the tele direction (in step SP344) and in the opposite case, the drive direction is set to the wide direction (in step SP346). This drive direction is memorized in the RAM of the control CPU 1.

FIG. 33 is a diagram for explaining timing in release operation in the case of pre-zoom operation. Referring to FIG. 33, when the release switch S2 is turned on, the signal $\overline{ZCW}$ for starting the regular rotation of the zoom motor M1 is supplied and then the signal $\overline{ZCCW}$ for stopping the zoom motor M1 is supplied. A change in speed of the zoom motor M1 is indicated in FIG. 33. More specifically, when the release switch S2 is turned on, pre-zoom operation is performed in response to the regular rotation start signal and the brake signal of the zoom motor M1 and after that the zoom motor M1 stops through its inertial rotation. The rotation for starting the rotation of the motor M1 is represented by (a), the braking period is represented by (b) and the inertial rotation period is represented by (c) in FIG. 33. After the pre-zoom operation is terminated, the signal $\overline{CS2}$ for designating a destination of data is supplied and the signal is transmitted to the shutter block 3. Thus, the serial communication clock signal SCK is outputted and in synchronization therewith, an output signal $\overline{SHTD}$ is supplied to provide the focusing data and the shutter control data. After the focusing data and the shutter control data are provided, a focusing start instruction signal $\overline{STR}$ is supplied. As a result, focusing as shown in a lower portion of FIG. 33 is started, so that the lens 12 is set for focusing. The period required for the setting of the lens is for example about 150 msec and this period is represented by (d). After the focusing, the shutter is opened and closed. Before the opening and closing of the shutter, a time (e) for setting the lens stable is given and after that, exposure (f) is effected. Referring to the operation diagram related with the focusing signal and the zoom motor M1 in FIG. 33, the pre-zoom operation and the inertial rotation of the zoom motor M1 need to be terminated before completion of the focusing. In other words, the time represented by ΔT in the figure needs to be positive. A release time lag in the period from the turn-on of the release switch S2 to the completion of the focusing is about 0.4 second at most.

Next, the timing for data transmission to the shutter block in release operation shown in (e) and (g) in FIG. 33 will be described. FIG. 34A is a diagram showing details of the timing for data transmission to the shutter block in release operation. Referring to FIG. 34A, when a signal $\overline{CS2}$ for designating a destination of data in the shutter block is supplied, a serial communication clock signal SCK is supplied in response thereto. In response to each cycle of the serial communication clock signal SCK, the shutter data $\overline{SHTD}$ of eight bits are serially supplied as output in the order of the focusing data and the shutter control data. After the output of the focusing data and shutter control data, the focusing start instruction signal $\overline{STR}$ is supplied. Referring to FIG. 34B, the contents of the shutter data $\overline{SHTD}$ will be described. The shutter data $\overline{SHTD}$ includes the focusing data and the shutter control data $EV_c$. The focusing data and the shutter control data $EV_c$ are both 8-bit data. In the focusing data, the less significant five bits out of the eight bits are used and the more significant three bits are set to 0. In the shutter control data $EV_c$, the most significant bit indicates whether the photographing mode is the flash mode or the non-flash mode, the subsequent more significant five bits represent an integer part and the less significant two bits represent a decimal part. If the most significant bit is 1, it indicates the flash mode and if the most significant bit is 0, it indicates the non-flash mode.

Figures 35A, 35B:
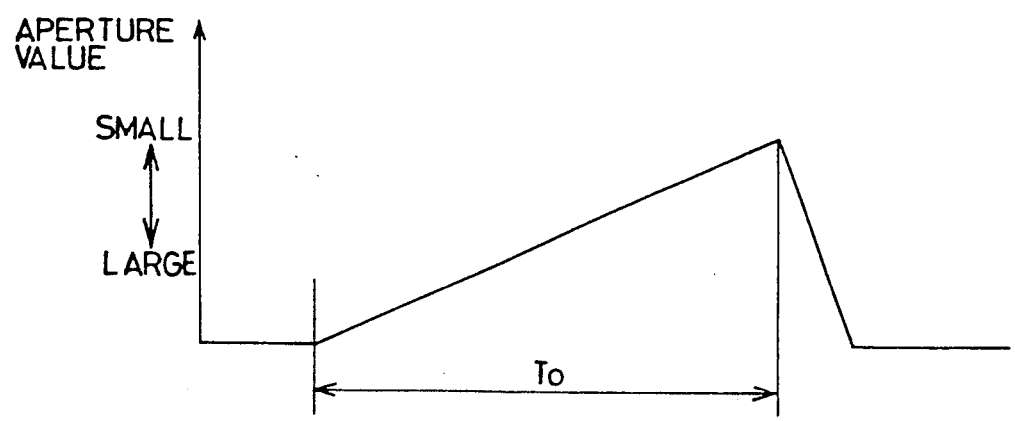
FIGS. 35A and 35B are diagrams showing a specified example of shutter control data.

Next, the shutter control data $EV_c$ described in connection with FIG. 34B will be described in more detail with reference to FIGS. 35A and 35B. FIG. 35A is a graph in which the Y axis represents an aperture value (F value) and the X axis represents a shutter opening time. Referring to FIG. 35A, the smaller the aperture value (F value) is, the larger the shutter opening time To is. The triangular area in FIG. 35A corresponds to an exposure amount.

FIG. 35B shows an example of the value $EV_c$ of the shutter control data. Referring to FIG. 35B, if the shutter control data value $EV_c$ is defined, the shutter opening time To corresponding thereto is defined. In this case, the shutter opening time To is represented in milliseconds.

Figure 36:
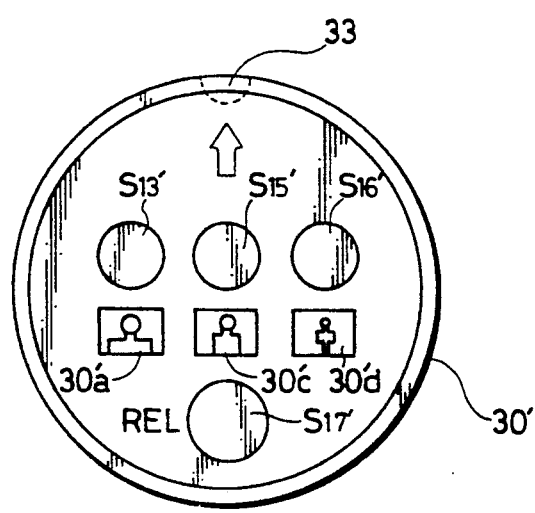
FIG. 36 shows a variant of a remote controller according to the present invention.

Next, a variant of the remote controller shown in FIG. 2C will be described. FIG. 36 shows the variant of the remote controller shown in FIG. 2C.

The remote controller 30' serving also as a lens cap includes a mark 30'a showing a range from the face to the shoulders of a person, a mark 30'c showing half the body of a person from the face to the waist, and a mark 30'd showing the whole body of a person, and it is provided with push buttons S13', S15' and S16'. The remote controller 30' supplies a remote control instructing signal to set the photographing magnification β of the camera to 1/30 in response to depression of the push button S13', to set the magnification β to 1/70 in response to depression of the push button S15', and to set the magnification β to 1/120 in response to depression of the push button S16'. In the camera body, the zoom motor M1 is driven in response to those remote control instructing signals and according to the distance to the object, and when the push buttons S13', S15' and S16' are depressed, the taking lens 12 is driven to set the photographing magnification for the range from the face to the shoulders of the object to 1/30, to set the photographing magnification for half the body to 1/70 and to set the photographing magnification for the full body to 1/120.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera system comprising:
   a remote control device provided separately from a camera, said remote control device including
   a manual operable member, and
   transmitting means for transmitting a prescribed signal by operation of said manual operable member; and
   the camera including
   distance measuring means for detecting a distance to an object, and
   means for recording information on a film based on the prescribed signal and the distance to the object.

2. The camera system in accordance with claim 1, wherein said prescribed signal indicates information on the photographing magnification.

3. A camera system comprising:
   remote control means provided separately from a camera, including
   transmitting means for transmitting a prescribed signal representing information on photographing magnification; and
   a camera including
   setting means for setting a photographing magnification in accordance with the transmitted prescribed signal,
   a taking leans capable of changing a focal length,
   distance measuring means for detecting a distance to an object,
   means for calculating the focal length of said taking lens based on the photographing magnification set by the setting means and the distance to the object detected by the distance measuring means, and
   drive means for driving said taking lens to attain the focal length calculated by said calculating means.

4. The camera system as claimed in claim 3, wherein said remote control means further includes an operating member, and said transmitting means transmits the prescribed signal by operation of said operating member.

5. The camera system as claimed in claim 4, wherein said operating member is used to designate a number of persons of said object.

6. The camera system as claimed in claim 4, wherein said operating member is used to designate a photographing range of said object.

7. The camera system as claimed in claim 3, wherein said remote control means is detachably attached to a camera body.

8. The camera system as claimed in claim 3, wherein said remote control means is provided in a lens cap detachably attached to a front of said taking lens to cover a front surface thereof.

9. The camera system as claimed in claim 8, wherein said lens cap includes an operating member, and said operating member is located on an inner surface of said lens cap, opposite the front surface of said taking lens when said lens cap covers said taking lens.

10. A camera system comprising:
    a lens cap provided detachably on a front of a taking lens to cover a front surface thereof, including
    an operating member located on a surface other than a front surface of said lens cap, and
    transmitting means for transmitting a prescribed signal to a camera body in a wireless manner in response to operation of said operating member; and
    a camera including
    the taking lens to be covered with said lens cap,
    receiving means for receiving said prescribed signal from said transmitting means in a wireless manner, and
    means for determining operation of said camera in response to said prescribed signal received by said receiving means.

11. A camera system comprising:
    a lens cap provided detachably on a front of a taking lens to cover a front surface thereof, including
    an operating member, and
    transmitting means having a light emitting member to provide a light signal for transmitting a prescribed signal to a camera body in response to operation of said operating member, wherein the light emitting member is located on a surface other than a front surface of said lens cap; and
    a camera including
    the taking lens to be covered with said lens cap,
    receiving means having a light receiving member to receive the light signal for receiving said prescribed signal from said transmitting means, and
    means for determining operation of said camera in response to said prescribed signal received by said receiving means.

12. A camera system comprising:
    means provided separately from a camera for transmitting a prescribed signal representing information on the photographing magnification; and
    a camera including
    means for receiving said prescribed signal from said transmitting means,
    setting means for setting a photographing magnification in accordance with said prescribed signal,
    a taking leans capable of changing a focal length,
    distance measuring means for detecting a distance to an object,
    means for calculating the focal length of said taking lens based on the photographing magnification set by the setting means and the distance to the object detected by the distance measuring means, and
    drive means for driving said taking lens to attain the focal length calculated by said calculating means.

13. The camera system as claimed in claim 12, wherein said transmitting means is a remote control device.

14. A camera system comprising:
    remote control means provided separately from a camera, including
    transmitting means for transmitting a prescribed signal representing information on the photographing magnification; and
    a camera including
    setting means for setting a photographing magnification in accordance with the transmitted prescribed signal,
    distance measuring means for detecting a distance to an object, and
    means for causing a picture with a desired composition, based on the photographing magnification set by the setting means and the distance to the object detected by the distance measuring means.

15. A camera system comprising:

remote control means provided separately from a camera, including transmitting means for transmitting a prescribed signal representing information on the photographing magnification; and a camera including setting means for setting a photographing magnification in accordance with the transmitted prescribed signal, distance measuring means for detecting a distance to an object, and means for calculating a focal length covering a desired area in an objective field, based on the photographing magnification set by the setting means and the distance to the object detected by the distance measuring means.

16. A camera system comprising:

remote control means provided separately from a camera, including transmitting means for transmitting a prescribed signal representing information on the photographing magnification; and a camera including setting means for setting a photographing magnification in accordance with the transmitted prescribed signal, distance measuring means for detecting a distance to an object, and means for determining an angle of view covering a desired area in an objective field, based on the photographing magnification set by the setting means and the distance to the object detected by the distance measuring means.

* * * * *

UNITED STATES PATENT AND TRADEMARK OFFICE
CERTIFICATE OF CORRECTION

PATENT NO. : 5,159,375
DATED : October 27, 1992
INVENTOR(S) : Nobuyuki Taniguchi, et al.

It is certified that error appears in the above-identified patent and that said Letters Patent is hereby corrected as shown below:

In Col. 1, line 7, delete "to" (first occurrence).

In Col. 6, line 57, in TABLE 1, change "regulator" to --regular--.

In Col. 10, line 63, change "10s" to --10ms--.

In Col. 12, line 46, change "strep" to --step--.

In Col. 18, line 25, after "FIG. 5" insert --)-- (close parenthesis).

In Col. 21, line 33 (claim 3, line 11), change "leans" to --lens--.

Signed and Sealed this

Ninth Day of November, 1993

BRUCE LEHMAN

Attest:

Attesting Officer

Commissioner of Patents and Trademarks